United States Patent
Masuda et al.

(10) Patent No.: US 7,898,709 B2
(45) Date of Patent: Mar. 1, 2011

(54) OPTICAL SCAN APPARATUS, IMAGE FORMATION APPARATUS, OPTICAL DEFLECTOR MANUFACTURING METHOD, POLYGON MIRROR PROCESSING METHOD, AND POLYGON MIRROR PROCESSING APPARATUS

(75) Inventors: Kensuke Masuda, Kodaira (JP); Yukio Itami, Yokohama (JP); Hisashi Inada, Isehara (JP); Kiyofumi Arai, Ebina (JP); Takeshi Kikuchi, Miyagi (JP); Yoshihiro Takahashi, Miyagi (JP); Tomotaka Takamura, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 438 days.

(21) Appl. No.: 12/013,206

(22) Filed: Jan. 11, 2008

(65) Prior Publication Data
US 2008/0174843 A1 Jul. 24, 2008

(30) Foreign Application Priority Data
Jan. 12, 2007 (JP) .................. 2007-004730
Mar. 2, 2007 (JP) .................. 2007-052205

(51) Int. Cl.
*G02B 26/08* (2006.01)
*B41J 27/00* (2006.01)

(52) U.S. Cl. .............. 359/204.1; 347/261; 359/219.1; 359/900

(58) Field of Classification Search ........... 83/875–877, 83/39, 56; 347/243, 261; 359/201.2, 203.1, 359/204.1, 204.4, 214.1, 217.1, 219.1, 896, 359/900; 399/216
See application file for complete search history.

(56) References Cited

U.S. PATENT DOCUMENTS

| | | | | |
|---|---|---|---|---|
| 4,826,271 A | * | 5/1989 | Takahashi et al. | 359/218.1 |
| 5,009,974 A | * | 4/1991 | Honda et al. | 430/123.4 |
| 5,069,515 A | | 12/1991 | Itami et al. | |
| 5,463,503 A | * | 10/1995 | Kawada et al. | 359/838 |
| 5,692,287 A | * | 12/1997 | Nakamura et al. | 29/558 |
| 5,726,699 A | | 3/1998 | Itami et al. | |
| 5,739,602 A | | 4/1998 | Suzuki et al. | |
| 5,769,544 A | | 6/1998 | Suzuki et al. | |
| 6,243,187 B1 | * | 6/2001 | Inenaga et al. | 359/200.1 |
| 6,574,023 B2 | * | 6/2003 | Matsui et al. | 359/198.1 |
| 6,580,186 B1 | | 6/2003 | Suzuki et al. | |
| 6,778,203 B2 | | 8/2004 | Itami et al. | |
| 6,822,775 B2 | | 11/2004 | Suzuki et al. | |
| 7,012,725 B2 | * | 3/2006 | Matsui et al. | 359/216.1 |
| 7,126,737 B2 | | 10/2006 | Atsuumi et al. | |
| 7,355,773 B2 | * | 4/2008 | Yamawaki | 359/216.1 |

(Continued)

FOREIGN PATENT DOCUMENTS

| | | | |
|---|---|---|---|
| JP | 06194593 A | * | 7/1994 |
| JP | 2001-228432 | | 8/2001 |
| JP | 2001-322012 | | 11/2001 |

(Continued)

*Primary Examiner* — Frank G Font
(74) *Attorney, Agent, or Firm* — Dickstein Shapiro LLP

(57) ABSTRACT

In the optical deflector, the mean width of profile elements of a cross section of the deflection surface in the sub scan direction is set to be less than the spacing between spots of the light beams formed in the sub scan direction of the deflection surface. This makes it possible to prevent a variation in the size and shape of the spots of the light beams deflected by the deflection surface due to the undulation (unevenness) of the deflection surface. As a result, it is able to suppress a decrease of the granularity of images and form images with high quality.

20 Claims, 21 Drawing Sheets

U.S. PATENT DOCUMENTS

| | | | |
|---|---|---|---|
| 7,456,963 B2 * | 11/2008 | Shishido et al. | 356/369 |
| 2006/0061847 A1 * | 3/2006 | Itami | 359/205 |
| 2006/0208179 A1 | 9/2006 | Itami | |
| 2007/0146852 A1 | 6/2007 | Itami | |
| 2007/0153349 A1 | 7/2007 | Itami et al. | |

FOREIGN PATENT DOCUMENTS

| | | |
|---|---|---|
| JP | 2005-092129 | 4/2005 |
| JP | 2006-301482 | 11/2006 |
| JP | 3227226 | 8/2007 |

* cited by examiner

UPPER STAGE ROUGH CUTTING

LOWER STAGE ROUGH CUTTING

UPPER STAGE FINISH CUTTING

LOWER STAGE FINISH CUTTING

OPTICAL SCAN APPARATUS, IMAGE FORMATION APPARATUS, OPTICAL DEFLECTOR MANUFACTURING METHOD, POLYGON MIRROR PROCESSING METHOD, AND POLYGON MIRROR PROCESSING APPARATUS

CROSS REFERENCE TO RELATED APPLICATION

The present application is based on and claims priority from Japanese Patent Application Nos. 2007-004730, filed on Jan. 12, 2007, and 2007-052205, filed on Mar. 2, 2007, the disclosure of which is hereby incorporated by reference in its entirety.

BACKGROUND OF THE INVENTION

1. Field of the Invention

The present invention relates to an optical scan apparatus which scans a scanning plane with a light beam, an image formation apparatus including the optical scan apparatus, a manufacturing method for an optical deflector used in the optical scan apparatus, a processing method for a deflection surface of a polygon mirror of the optical deflector, and a polygon mirror processing apparatus.

2. Description of Related Art

A known image formation apparatus using the Carlson process forms images by, for example, scanning the surface of a rotating photoconductive drum with a plurality of light beams to form an electrostatic latent image thereon, visualizing the electrostatic latent image as a toner image, and fusing the toner image on a sheet of paper as a recording medium. In recent years, this type of image formation apparatus has been well used in easy printing as an on-demand print system. There has been increasing demand for formation of high-density images and speeding-up of image outputs.

In general, in order to speed up the image outputs, a print speed is increased by increasing the rotation speed of a polygon mirror deflecting the light beam and the rotation speed of the photoconductive drum. However, there is a problem that along with the increase of the rotation speed of the polygon mirror, noise and vibration from a drive system is increased as well as an amount of heat emission. Further, the speeding-up of the image outputs has a trade-off relation with formation of the high-density images so that image quality deteriorates as the rotation speed of the polygon mirror increases.

In view of the above problems, Japanese Patent No. 3227226 has disclosed an image formation apparatus which includes a multi-beam light source and scans the photoconductive drum with plural light beams in order to concurrently realize the formation of the high-density images and the speeding-up of image outputs. This image formation apparatus is provided with a vertical cavity surface emitting laser (VCSEL) having plural luminous points and can collectively deflect the plural light beams from the VCSEL by the polygon mirror to thereby scan the photoconductive drum with the plural light beams at the same time.

Also, with regard to the speeding-up of the operation of a multi-color image formation apparatus, Japanese Laid-Open Patent Application Publication No. 2005-92129 has disclosed an optical deflector with a plurality of small-sized polygon mirrors which are superimposedly disposed in a rotation axis direction such that respective deflection surfaces of the polygon mirrors are shifted by a predetermined angle (with a phase difference), and coupled firmly with each other. With such a configuration, the optical deflector generates little noise even during the high-speed rotation, and the polygon mirrors are not likely to be shifted from each other in accordance with angular velocity changes or temperature changes. Accordingly, such an optical deflector does not cause color shifts in images. Combining the optical deflector with such polygon mirrors with the afore-mentioned vertical cavity surface emitting laser makes it possible to realize a multi-color image formation apparatus which can form high-density images with less color shifts at high speed.

However, there is a problem that in deflecting multiple light beams from a light source with a conventional optical deflector, spots of the light beams have different shapes and sizes due to the shapes of deflection surfaces of the optical deflector, causing generation of scattered light. Specifically, when the deflection surface has an undulation (unevenness) around incident positions of the light beams, the spot shapes of the light beams are differentiated due to the lens effect, resulting in deteriorating granularity of the images. Particularly, in the multi-color image formation apparatus forming images by superimposing toner images of plural colors, dot shifts occur in every color, and the image quality as color reproducibility is degraded.

Generally, the deflection surfaces of the optical deflector are formed by mirror-cutting; therefore, there are minute cutting traces left thereon. In the optical scan apparatus with the multiple light beams whose deflection area is broader than that of a single light beam, striking the cutting traces, the light beams will be scattered, which may cause generation of a ghost image.

Moreover, from the viewpoints of cutting process for the deflection surface, Japanese Laid-Open Patent Application Publication No. 2001-228432 has disclosed a mirror-cutting process in which polygon mirrors and a motor are integrated as a rotary body and the rotary body is rotated to mirror-cut the polygon mirrors. In this case, the outer diameter of the polygon mirrors is the greatest in the rotary body, and vertical two-stage mirrors are disposed at the same phase in the rotation direction. Because of this, it is easy to mirror-cut the polygon mirrors without interference of the rotary body and a cutting tool.

Japanese Laid-Open Patent Application Publication No. 2001-322012 has disclosed a polygon mirror processing device which includes a rough cutting tool 1a and a finish cutting tool 1b both attached to a holder in such a manner that the cutting tool 1a comes ahead of the cutting tool 1b in a feeding direction of a work (polygon mirror), and performs the rough cutting and finish cutting to the polygon mirror at the same time.

It is difficult to mirror-out the polygon mirrors with use of the above known processing device when the polygon mirrors are superimposedly disposed and fixed in a rotation axis direction, having deflection surfaces with a phase difference in a rotation direction, since there is a possibility that a portion thereof not being processed interferes with the cutting tools during the cutting process. To mirror-cut such polygon mirrors, they have to be individually cut first and then superimposedly disposed. However, there is a problem that when disposing the polygon mirrors, the fixed positions thereof may be shifted from each other, causing rotational movements or deformation of shape of the deflection surfaces and degrading surface precision. Further, in the optical scan apparatus and the image formation apparatus, the superimposed disposition causes variations of the deflection surfaces in the inclination direction relative to the rotation axis, resulting in deterioration in print quality.

SUMMARY OF THE INVENTION

In view of solving the above problems, an object of the present invention is to provide an optical scan apparatus with improved scan speed and scan precision.

Another object of the present invention is to provide an image formation apparatus which can form high-precision images.

Another object of the present invention is to provide a manufacturing method for an optical deflector which is used in the optical scan apparatus and can improve the scan speed and scan precision thereof.

Another object of the present invention is to provide a polygon mirror processing method which enables the deflection surfaces of polygon mirrors integrated in a complex shape to be processed by mirror-cutting and can obtain high-precision deflection surfaces.

According to one aspect of the present invention, an optical scan apparatus comprising an optical deflector which rotates around a predetermined rotation axis to scan a scanning plane with at least three or more light beams in a main scan direction, the at least three or more light beams being spaced in a sub scan direction, in which a mean width of profile elements of a cross section of a deflection surface of the optical deflector in the sub scan direction is set to be smaller than a spacing of spots of the light beams which are formed adjacent to the deflection surface in the sub scan direction.

According to another aspect of the present invention, in the optical scan apparatus, the deflection surface of the optical deflector is formed by mirror-cutting in the main scan direction, and a cutting width of the mirror-cutting in the sub scan direction is greater than an illumination area of the light beams incident on the deflection surface in the sub scan direction.

According to another aspect of the present invention, in the optical scan apparatus, the optical deflector includes a first polygon mirror and a second polygon mirror each having a plurality of deflection surfaces, and the first and second polygon mirrors are superimposedly disposed in a vertical direction relative to the rotation axis so that the deflection surfaces of the first polygon mirror and those of the second polygon mirror are shifted from each other by a predetermined angle around the rotation axis.

According to another aspect of the present invention, provided is a manufacturing method for an optical deflector in which a mean width of profile elements of a cross section of a deflection surface in a sub scan direction is set to be smaller than a spacing of spots of the light beams which are formed adjacent to the deflection surface in the sub scan direction. The method comprises a rough cutting step of forming a rough deflection surface on the optical deflector; and a finish cutting step of cutting the rough deflection surface by rotating a cutting member around a rotation axis while moving the optical deflector in a predetermined rotation axis direction at a predetermined speed, to form a deflection surface, the rotation axis being perpendicular to the predetermined rotation axis direction of the optical deflector, in which a size of an illumination area of a light beam incident on the deflection surface in the sub scan direction is set to be smaller than a value which is obtained by dividing a moving distance of the optical deflector in the rotation axis direction per a predetermined time by a rotation speed of the cutting member per a predetermined time.

According to another aspect of the present invention, an image formation apparatus comprises an optical deflector in which a mean width of profile elements of a cross section of a deflection surface in a sub scan direction is set to be smaller than a spacing of spots of light beams which are formed adjacent to the deflection surface in the sub scan direction, an optical scan apparatus which rotates the optical deflector around a predetermined rotation axis to scan a scanning plane with at least three or more light beams in a main scan direction, the at least three or more light beams being spaced in a sub scan direction, a photoreceptor on which an electrostatic latent image is formed on a scanned surface by the optical scan apparatus, a developer section which visualizes, as a toner image, the electrostatic latent image formed on the scanned surface of the photoreceptor, and a transfer section which fuses the toner image visualized by the developer section on a recording medium.

According to another aspect of the present invention, provided is a polygon mirror processing method for processing deflection surfaces of a polygon mirror of the optical scan apparatus by using an apparatus with a rotatable support body and rotating the support body which has a rough cutting member and a finish cutting member disposed thereon at different distances to a center of the rotation of the support body. The method comprises a first step of identifying a deflection surface to be processed, a second step of roughly cutting the identified deflection surface by the rough cutting member, a third step of evacuating the rough cutting member, and a fourth step of finish cutting the roughly cut deflection surface by the finish cutting member.

According to another aspect of the present invention, provided is a polygon mirror processing method for processing deflection surfaces of a polygon mirror of the optical scan apparatus by using an apparatus with a rotatable support body and rotating the support body which has a rough cutting member and a finish cutting member disposed thereon at different distances to a center of the rotation of the support body. The method comprises a first step of identifying a deflection surface to be processed of a first polygon mirror, a second step of roughly cutting the identified deflection surface of the first polygon mirror by the rough cutting member, a third step of evacuating the rough cutting member, a fourth step of identifying a deflection surface to be processed of a second polygon mirror, a fifth step of roughly cutting the identified deflection surface of the second polygon mirror by the rough cutting member, a sixth step of evacuating the rough cutting member, a seventh step of identifying the roughly cut deflection surface of the first polygon mirror, an eighth step of finish cutting the identified roughly cut deflection surface of the first polygon mirror by the finish cutting member, a ninth step of evacuating the finish cutting member, a tenth step of identifying the roughly cut deflection surface of the second polygon mirror, an eleventh step of finish cutting the identified roughly cut deflection surface of the second polygon mirror by the finish cutting member, and a twelfth step of evacuating the finish cutting member.

According to another aspect of the present invention, provided is a polygon mirror processing method for processing deflection surfaces of a polygon mirror of the optical scan apparatus by using an apparatus with a rotatable support body and rotating the support body which has a rough cutting member and a finish cutting member disposed thereon at different distances to a center of the rotation of the support body. The method comprises a first step of identifying a deflection surface to be processed of a first polygon mirror, a second step of roughly cutting the identified deflection surface of the first polygon mirror by the rough cutting member, a third step of evacuating the rough cutting member, a fourth step of finish cutting the roughly cut deflection surface of the first polygon mirror by the finish cutting member, a fifth step of evacuating the finish cutting member, a sixth step of identifying a deflection surface of a second polygon mirror, a seventh step of roughly cutting the identified deflection surface of the second polygon mirror by the rough cutting member, an eighth step of evacuating the rough cutting member, a ninth step of finish cutting the identified roughly cut deflection surface of the second polygon mirror by the finish cutting member, and a tenth step of evacuating the finish cutting member.

According to another aspect of the present invention, a polygon mirror processing apparatus comprises an indexing fixture having an indexing disc which fixes a polygon mirror and rotates the polygon mirror to identify a deflection surface to be processed, an X-axis stage being movable in a rotation axis direction of the indexing disc and on which the indexing fixture is fixed, a Z-axis stage being movable in a direction perpendicular to the X-axis stage, a rotary driver section being fixed on the Z-axis stage, and a support body being attached to a main rotation axis of the rotary driver section, in which a relational expression, $R1-R2>L1$ is satisfied where a distance between a center of the support body and a center of the rough cutting member is R1, a distance between a center of the support body and a center of the finish cutting member is R2, and a length of the polygon mirror in the rotation axis direction is L1.

According to another aspect of the present invention, in the polygon mirror processing apparatus, relational expressions, $C1>B-A$ and $C2>B-A$ are satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C1, and an amount of projection of a tip portion of the finish cutting member is C2.

According to another aspect of the present invention, a polygon mirror processing apparatus comprises an indexing fixture having an indexing disc which fixes a polygon mirror and rotates the polygon mirror to identify a deflection surface to be processed, an X-axis stage being movable in a rotation axis direction of the indexing disc, and on which the indexing fixture is fixed, a Z-axis stage being movable in a direction perpendicular to the X-axis stage, a rotary driver section being fixed on the Z-axis stage; and a support body being attached to a main rotation axis of the rotary driver section, in which a relational expression, $R3-R4>L2$ is satisfied where a distance between a center of the support body and a center of the rough cutting member is R3, a distance between a center of the support body and a center of the finish cutting member is R4, and a distance from a top surface of the first polygon mirror in the rotation axis direction to a bottom surface of the second polygon mirror in the rotation axis direction is L2.

According to another aspect of the present invention, in the polygon mirror processing apparatus, a relational expression, $C4-C3>B-A$ is satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C3, and an amount of projection of a tip portion of the finish cutting member is C4.

DETAILED DESCRIPTION OF THE PREFERRED EMBODIMENTS

First Embodiment

Figure 1:
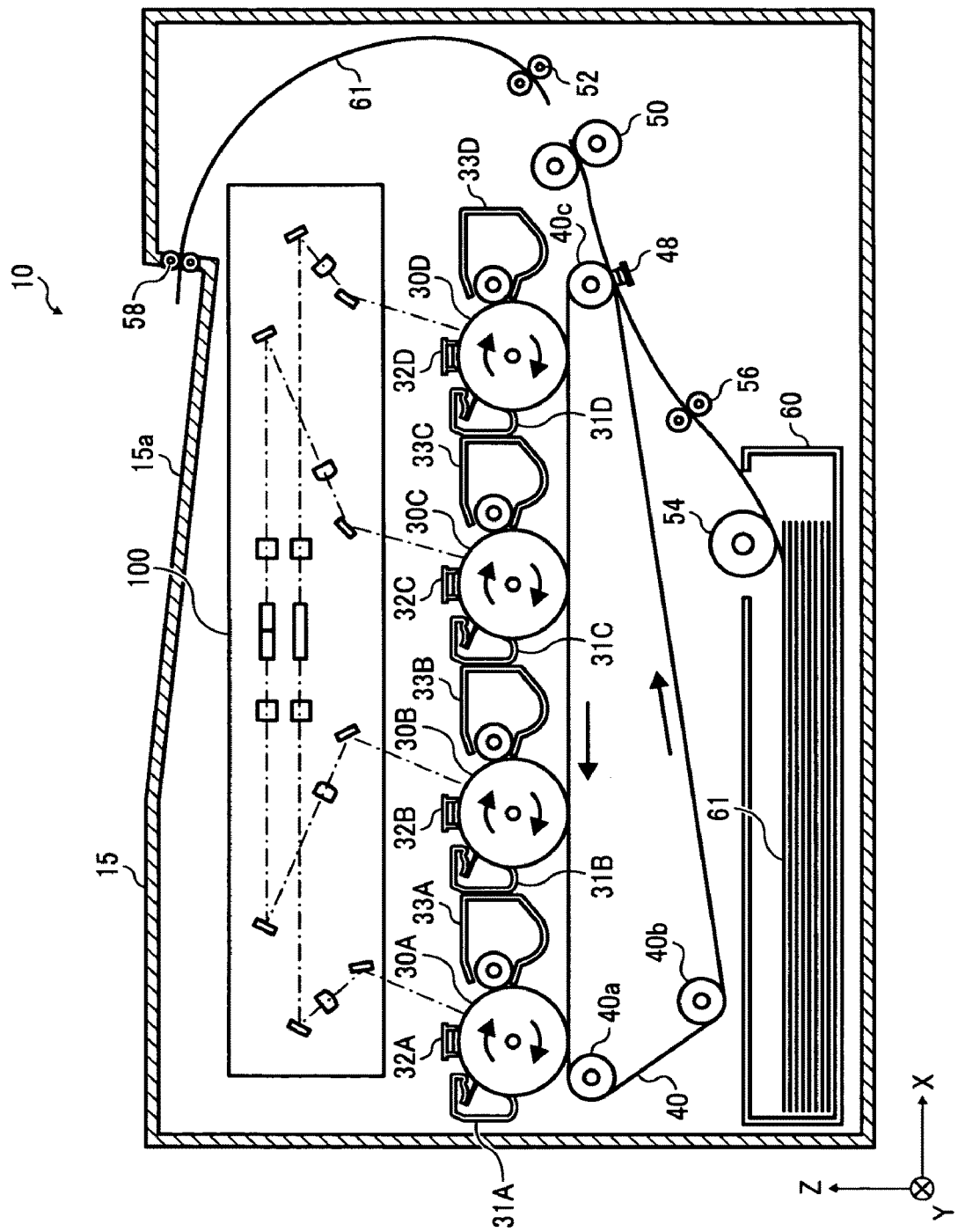
FIG. 1 shows a schematic structure of an image formation apparatus 10 according to a first embodiment of the present invention.

Hereinafter, the first embodiment of the present invention will be described with reference to FIGS. 1 to 8. FIG. 1 shows the schematic structure of an image formation apparatus 10 according to the first embodiment.

The image formation apparatus is a tandem electrophotographic color printer to print multi-color images by superimposing toner images in black, yellow, magenta and cyan colors and transferring them onto paper, for example. The image formation apparatus 10 includes an optical scan apparatus 100, four photoconductive drums 30A, 30B, 30C, 30D, a transfer belt 40, a fuse roller 50, a paper feed roller 54, a first resist roller pair 56, a second resist roller pair 52, a discharge roller 58, a paper feed tray 60, a not-shown controller for controlling the above components collectively, and a housing 15 of a substantially rectangular solid shape containing the above components.

The housing 15 has a discharge tray 15a discharging printed sheets of paper. The optical scan apparatus 100 is placed under the discharge tray 15a. The optical scan apparatus 100 scans the photoconductive drum 30A with a light beam of a black image component modulated according to image information supplied from a higher-level device (personal computer or the like). Likewise, the optical scan apparatus 100 scans the photoconductive drum 3013 with a light beam of a cyan image component. The optical scan apparatus 100 scans the photoconductive drum 30C with a light beam of a magenta image component. The optical scan apparatus 100 scans the photoconductive drum 30D with a light beam of a yellow image component. The structure of the optical scan apparatus 100 will be described later.

The four photoconductive drums 30A, 30B, 30C, 30D are cylindrical members and have photoconductive layers on their respective surfaces which have property to become conductive when illuminated with the light beam. They are disposed in an X-axis direction with an equal interval under the optical scan apparatus 100.

The photoconductive drum 30A is disposed at end of a reverse X-axis direction inside the housing 16 so that its longitudinal direction is the Y-axis direction. The photoconductive drum 30A is rotated by a not-shown rotation mechanism clockwise (as indicated by black arrows) in FIG. 1. Around the photoconductive drum 30A disposed are an electric charger 32A at 12 o'clock position (upper side), a toner cartridge 33A at 2 o'clock position and a cleaning case 31A at 10 o'clock position in FIG. 1.

The electric charger 32A is disposed with a predetermined clearance over the surface of the photoconductive drum 30A with its longitudinal direction as the Y-axis direction. It electrically charges the surface of the photoconductive drum 30A with a predetermined voltage.

The toner cartridge 33A includes a cartridge body containing a toner of black image components and a developer roller charged with a voltage of reverse polarity of that of the photoconductive drum 30A, and the like. The toner cartridge 33A supplies a toner in the cartridge body to the surface of the photoconductive drum 30A via the developer roller.

The cleaning case 31A is provided with a cleaning blade of a rectangular shape with its longitudinal direction as the Y-axis direction, and it is disposed so that one end of the cleaning blade gets in contact with the surface of the photoconductive drum 30A. The toner sticking on the surface of the photoconductive drum 30A is removed by the cleaning blade along with the rotation of the photoconductive drum 30A and collected in the cleaning case 31A.

The photoconductive drums 30B, 30C, 30D are placed in sequence in the X-axis direction from the photoconductive drum 30A with a predetermined interval. They are rotated by a not-shown rotation mechanism clockwise (as indicated by the black arrows) in FIG. 1. Similarly to the photoconductive drum 30A, electric chargers 32B, 32C, 32D, toner cartridges 33B, 33C, 33D, cleaning cases 31B, 31C, 31D are disposed around the photoconductive drums 30B, 30C, 30D, respectively.

The electric chargers 32B, 82C, 32D are disposed as the electric charger 32A to electrically charge the surfaces of the photoconductive drums 30B, 30C, 30D with a predetermined voltage, respectively.

The toner cartridges 33B, 33C, 33D include cartridge bodies containing toners of cyan, magenta, yellow image components and developer rollers charged with a voltage of reverse polarity of that of the photoconductive drums 30B, 30C, 30D, and the like, respectively. The toner cartridges 33B, 33C, 33D supply the toners in the cartridge bodies to the surfaces of the photoconductive drums 30B, 30C, 30D via the developer rollers, respectively.

The structure, arrangement, and function of the cleaning cases 31B, 31C, 31D are the same as those of the cleaning case 31A.

Hereinafter, a unit of the photoconductive drum 30A, the electric charger 32A, the toner cartridge 33A, and the cleaning case 31A is to be referred to as the first station, likewise, a unit of the photoconductive drum 30B, the electric charger 32B, the toner cartridge 33B, and the cleaning case 31B as the second station, a unit of the photoconductive drum 30C, the electric charger 32C, the toner cartridge 33C, and the cleaning case 31C as the third station, and a unit of the photoconductive drum 30D, the electric charger 32D, the toner cartridge 33D, and the cleaning case 31D as the fourth station.

The transfer belt 40 is a free end ring-like member and rolls over driven rollers 40a, 40c placed under the photoconductive drums 30A, 30D, respectively, and rolls over a driven roller 40B which is placed at a slightly lower position than the driven rollers 40a, 40c. The upper side surface of the transfer belt 40 is in contact with the lower surfaces of the photoconductive drums 30A, 30B, 30C, 30D. The transfer belt 40 is rotated counterclockwise (as indicated by the black arrows in FIG. 1) by counterclockwise rotation of the driven roller 40b. The transfer charger 48 is applied with a voltage of a reverse polarity of that of the electric chargers 32A, 32B, 32C, 32D and is placed close to one end of the transfer belt 40 in the X-axis direction.

The paper feed tray 60 of a substantially rectangular solid shape is placed under the transfer belt 40 and contains piled-up paper sheets 61 for printing. The paper feed tray 60 has a feeder outlet of a rectangular shape close to one end of the upper surface thereof in the X-axis direction.

The paper feed roller 54 extracts paper sheets 61 one by one from the paper feed tray 60 to feed them to a gap formed between the transfer belt 40 and the transfer charger 48 via the resist roller 56 composed of a pair of rotation rollers.

The fuse roller 50 is composed of a pair of rotation rollers, and applies heat and pressure to the paper sheets 61 to feed the paper sheets 61 to the discharge roller 58 via the resist roller 52 composed of a pair of rotation rollers. The discharge roller 58 is composed of a pair of rotation rollers and discharges the paper sheets 61 to the discharge tray 15a.

Next, with reference to FIGS. 2 and 3, the structure of the optical scan apparatus 100 will be described. The optical scan apparatus 100 is placed over the photoconductive drums 30A, 30B, 30C, 30D.

The optical scan apparatus 100 includes an optical scan system composed of a polygon mirror 104, an fθ lens 105 disposed in the reverse X-axis direction of the polygon mirror 104, a reflective mirror 106A disposed in the reverse X-axis direction of the fθ lens 105, a reflective mirror 108A disposed under the reflective mirror 106A, a toroidal lens 107A disposed between the reflective mirrors 106A and 108A, and another optical scan system composed of the fθ lens 105 disposed in the reverse X-axis direction of the polygon mirror 104, a reflective mirror 106B disposed in the reverse X-axis direction of the fθ lens 105, a reflective mirror 108B disposed under the reflective mirror 10613, a toroidal lens 107B disposed between the reflective mirrors 106B and 108B.

Also, the optical scan apparatus 100 includes another optical scan system composed of the polygon mirror 104, an fθ lens 305 disposed in the X-axis direction of the polygon mirror 104, a reflective mirror 306D disposed in the X-axis direction of the fθ lens 305, a reflective mirror 308D disposed under the reflective mirror 306D, a toroidal lens 307D disposed between the reflective mirrors 306D and 308D, and another optical scan system composed of the fθ lens 305 disposed in the X-axis direction of the polygon mirror 104, a reflective mirror 306C disposed in the X-axis direction of the fθ lens 305, a reflective mirror 308C disposed under the reflective mirror 306C, a toroidal lens 307C disposed between the reflective mirrors 306C and 308C.

Moreover, the optical scan apparatus 100 includes two optical incidence systems 200A, 200B. The optical incidence system 200A allows a light beam for scanning the first and second stations to be incident on the polygon mirror 104, and the optical incidence system 200B allows a light beam for scanning the third and fourth stations to be incident on the polygon mirror 104.

Figure 2:
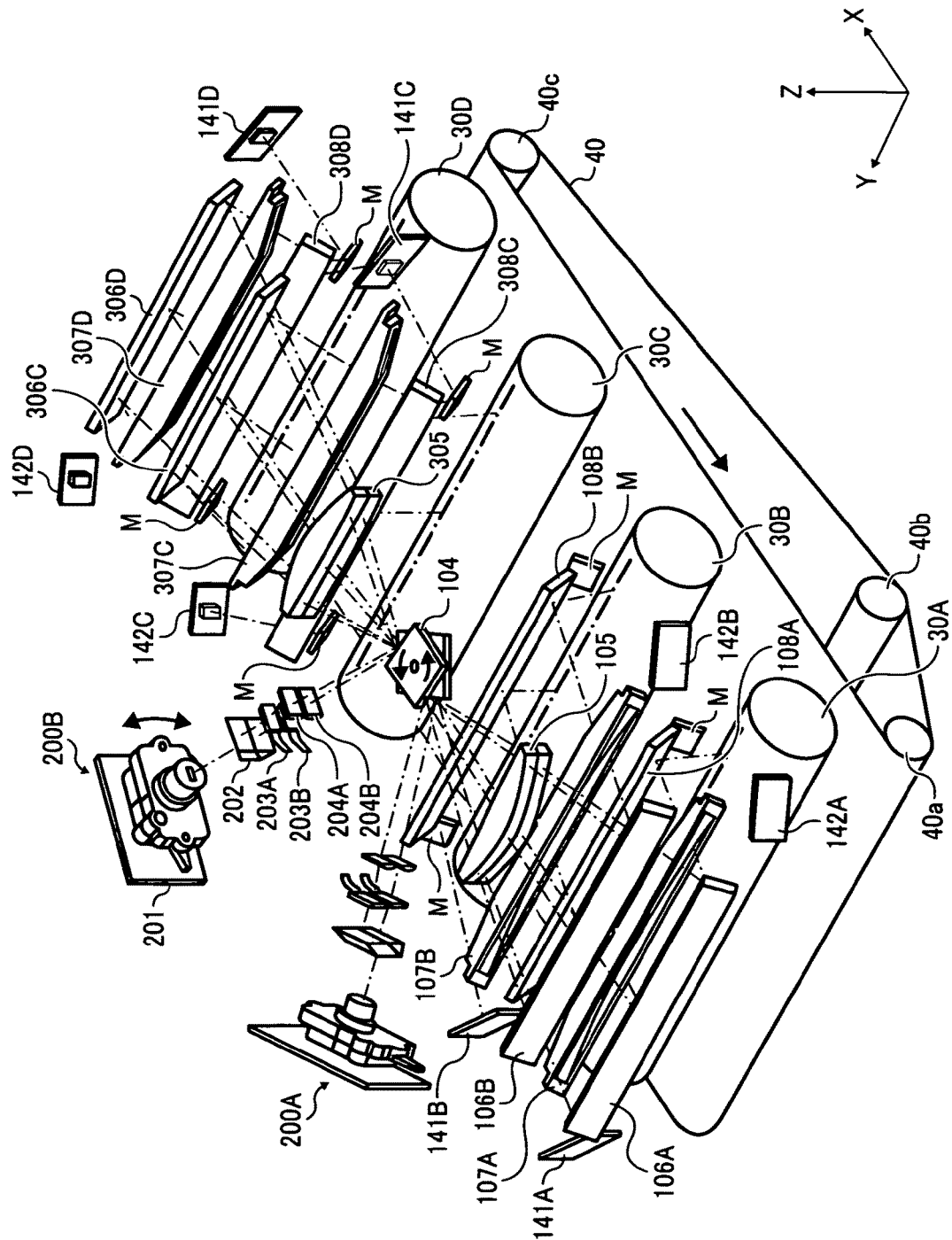
FIG. 2 is a perspective view of an optical scan apparatus 100 according to the first embodiment of the present invention.

The optical incidence systems 200A, 200B (FIG. 2 shows only 200B) each include a light source unit 201, a splitter prism 202, a pair of liquid crystal elements 203A, 203B, and a pair of cylindrical lenses 204A, 204B.

Figure 4:
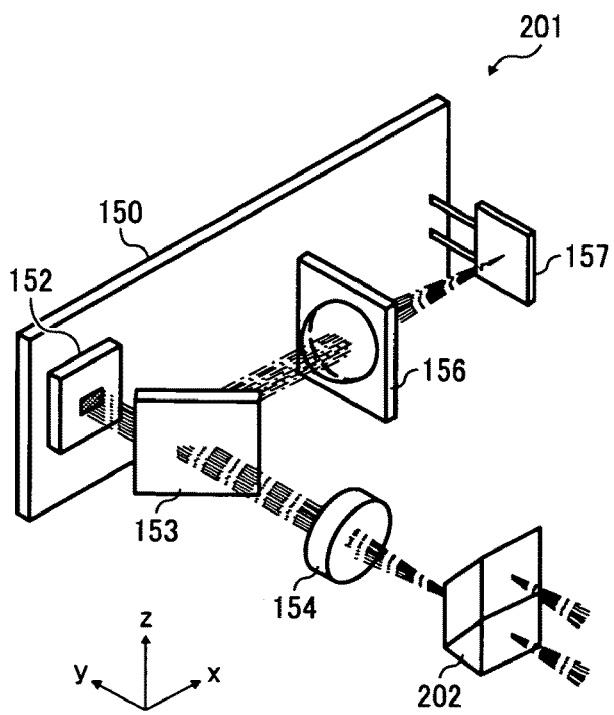
FIG. 4 is a perspective view showing a schematic structure of a light source unit 201 in the optical scan apparatus 100 according to the first embodiment of the present invention.

FIG. 4 shows the structure of the light source unit 201 together with the splitter prism 202. The light source unit 201 is composed of a rectangular base plate 150 with its longitudinal direction as the X-axis direction and a laser array 152 mounted on a plane of the base plate 150 in the reverse Y-axis direction, a split mirror 153, a coupling lens 154, a convergent lens 156, and a light receiving element 157.

Figure 5:
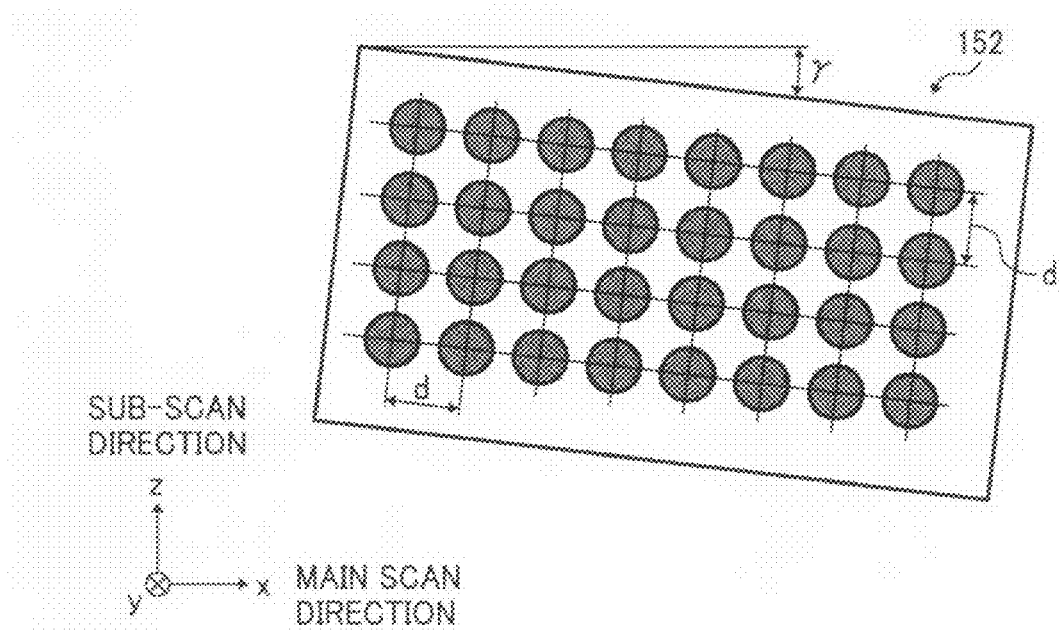
FIG. 5 is a plain view of a laser array 152 in the optical scan apparatus 100 according to the first embodiment of the present invention.

The laser array 152 is a vertical cavity surface emitting laser (VCSEL) in which light sources are two-dimensionally arranged, as shown in both of FIGS. 4 and 5. The laser array 152 is fixed in such a state that it is rotated clockwise (seen from the near side of FIG. 5) by an angle γ relative to the base plate 150 around the Y axis. On the plane of the laser array 152 in the reverse Y-axis direction, 32 light sources (VCSEL) are arranged in matrix of 4 rows and 8 columns with vertical and horizontal spacing d, as shown in FIG. 5. This arrangement allows each station to be scanned with all of the 32 light beams at once.

Here, the angle γ is expressed by the following expression (1):

$$\sin \gamma = (\cos \gamma)/n = p/d \cdot \beta s$$

where sub scan magnification is $\beta s$, line pitch is p, and the number of columns of the matrix is n.

Note that the light sources of the laser array 152 can be arranged at the processing stage of the laser array 152 such that the light sources in the row direction makes an angle γ relative to a main scan direction, in spite of the laser array 152 fixed in the state that it is rotated by the angle γ as described above.

Returning to FIG. 4, the split mirror 153 is placed on the side of the light source unit 201 in the reverse Y-axis direction to have the light beam emitted from the laser array 152 transmitting therethrough to split (reflect) a part of the light beam in the X-axis direction.

The convergent lens 156 collects, on the light receiving element 157, the light beam split in the X-axis direction by the split mirror 153. The splitter prism 202 vertically splits into two the light beam incident from the laser array 152 via the coupling lens 154, and emits them with a predetermined interval in the reverse Y-axis direction as the sub scan direction.

The light source unit 201 as configured above is driven by a not-shown controller based on image information. Each light source of the laser array 152 is driven before scan of a write area of a scanning plane (surface of the photoconductive drum), to adjust the intensity of each light beam therefrom to a preset intensity in advance according to a signal output from the light receiving element 157.

Returning to FIG. 2, the liquid crystal elements 203A, 203B are arranged ahead of an exit plane of the splitter prism 202 so that they are vertically adjacent to each other, and they deflect the light beam in the sub scan direction according to a voltage signal from the not-shown controller.

The cylindrical lenses 204A, 204B vertically adjacent to each other are arranged ahead of the exits planes of the liquid crystal elements 203A, 203B so as to correspond to the two split light beams by the splitter prism 202. One of the cylindrical lenses 204A, 204B is disposed so that its revolution around the optical axis is adjustable, in order to adjust focal lines of the two split light beam by the splitter prism 202 to be parallel to each other, and it gathers the light beams incident thereon to the polygon mirror 104.

The cylindrical lenses 204A, 204B have positive curvature at least in the sub scan direction to temporarily converge the light beams on the reflection surface of the polygon mirror 104. The convergence of the light beams on the reflection surface of the polygon mirror 104 and the function of the toroidal lenses 107A to 107D (described later) form an optical face tangle error correction system which makes deflection points and image formed positions on the surfaces of the photoconductive drums 30A to 30D conjugated with each other in the sub scan direction.

The polygon mirror 104 is composed of a pair of square prism members with deflection surfaces on its side planes. The square prism members are vertically adjacent to each other with a phase shift of 45 degrees and rotated by a not-shown rotation mechanism in the direction indicated by the arrows in FIG. 2 with a predetermined angular velocity. Accordingly, the light beam is vertically split into two by the splitter prism 202 of the optical incidence system 200A, gathered and deflected on the deflection surfaces of the polygon mirror 104, and is made incident alternatively on the photoconductive drums 30A, 30B. Likewise, the light beam is vertically split into two by the splitter prism 202 of the optical incidence system 200B, gathered and deflected on the upper and lower deflection surfaces of the polygon mirror 104, and made incident alternatively on the photoconductive drums 30C, 30D.

Figure 6:
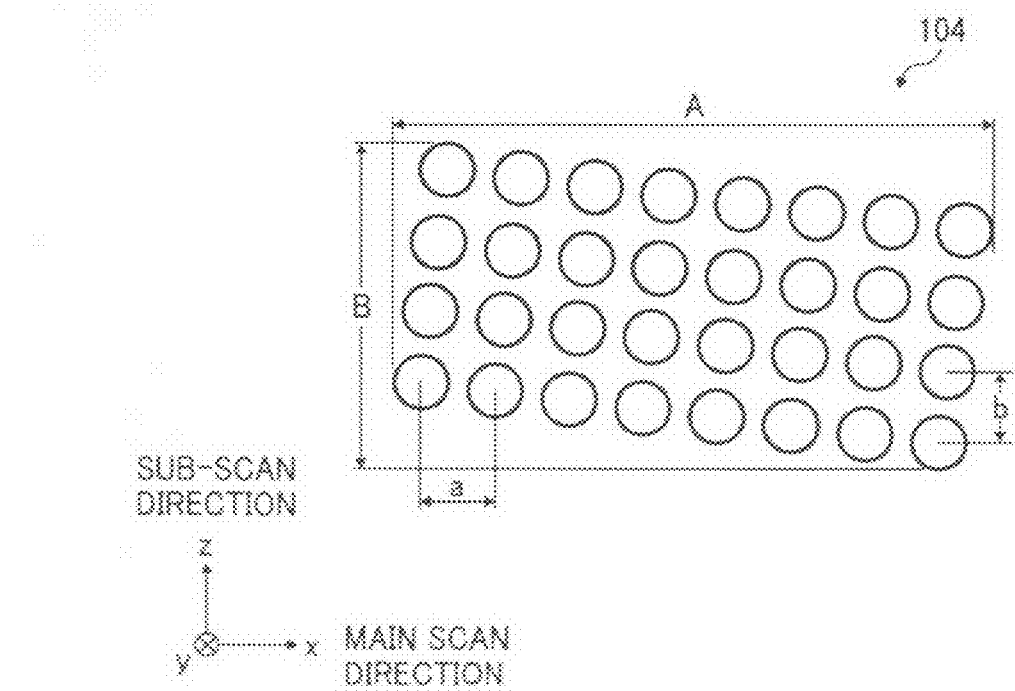
FIG. 6 shows spots of a light beam on the deflection surface of a polygon mirror 104 according to the first embodiment of the preset invention.

FIG. 6 shows spots of the light beams on one of the eight deflection surfaces of the polygon mirror 104. As shown therein, the spots of the light beams from the 32 light sources of the laser array 152 are in lines in the main and sub scan directions with spacing a, b, respectively. The illumination area of the light beams in the main scan direction is A, and that in the sub scan direction is B.

Figure 7:
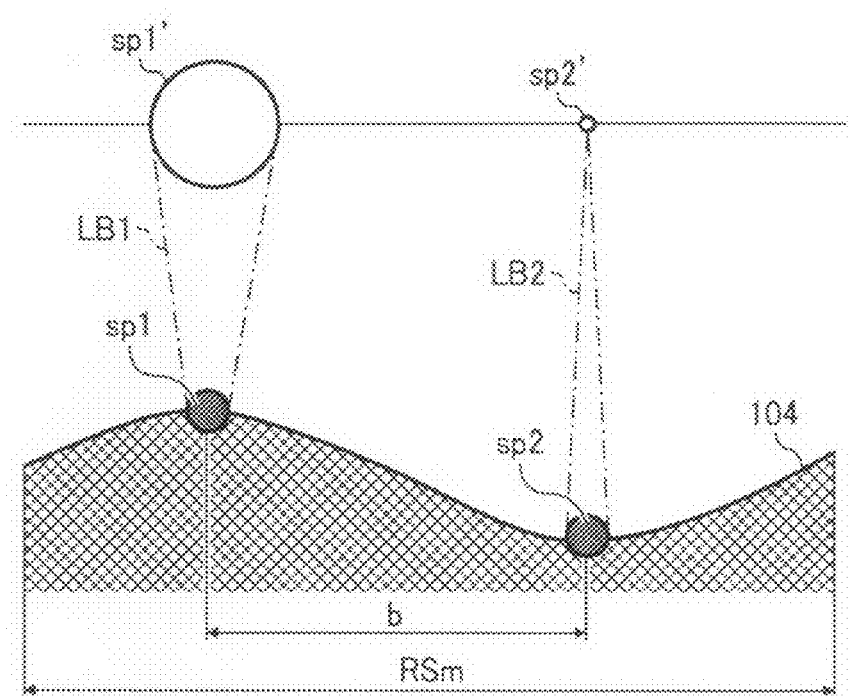
FIG. 7 is an explanatory diagram for variation of a spot diameter caused due to unevenness of the deflection surface of the polygon mirror 104 according to the first embodiment of the present invention.

Generally, the deflection surfaces of the deflector such as the polygon mirror have an unevenness of 0.1 μm order. Depending on a position thereof at which incident light beam is deflected, the diameter of the spot may be increased or decreased after the deflection. For example, FIG. 7 shows black circles as spots sp1, sp2 of the light beam incident on the deflection surface of the polygon mirror 104, and a white circle as spots sp1', sp2' of the light beam deflected thereby. As shown in FIG. 7, the spots sp1, sp2 have a substantially same shape and size on the deflection surface of the polygon mirror 104, however, the spot sp1' of the light beam LB1 deflected at a convexed position relative to the deflection direction is larger in size than the spot sp2' of the light beam LB2 deflected at a concaved position relative to the deflection direction. This occurs because the light beam deflected at the convexed position is diverged while the light beam deflected at the concaved position is converged. For prevention of the variation in the spot diameter of the light beams, the polygon mirror 104 according to the present invention is configured such that the mean width RSm of profile elements of a cross section of the deflection surface in the sub scan direction is to be less than or equal to a distance b (RSm≦b) between adjacent spots in sub scan direction.

Figure 8:
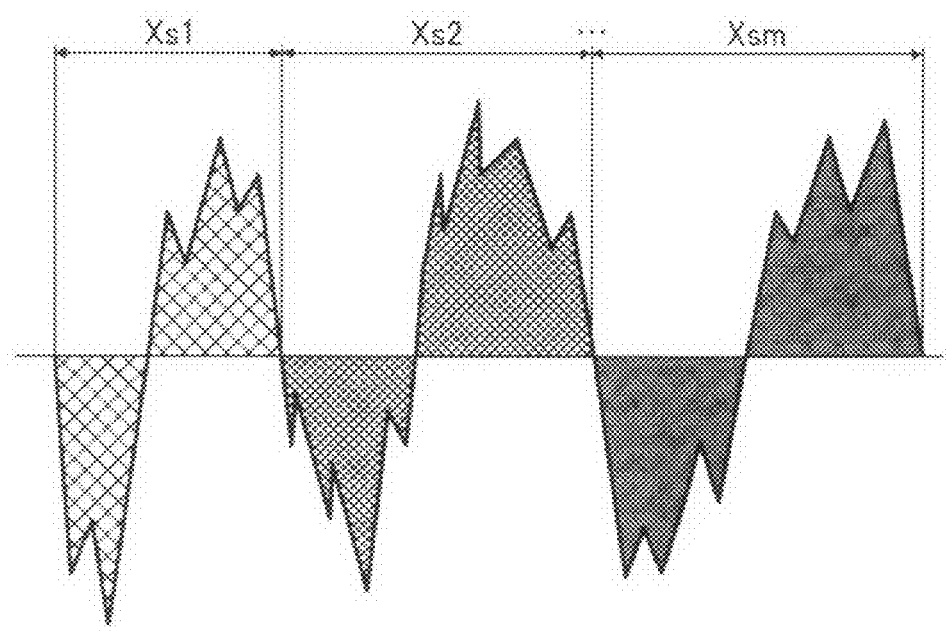
FIG. 8 is an explanatory diagram for the mean width of profile elements of a cross section of the deflection surface according to the first embodiment of the present invention.

Note that the mean width RSm is one of parameters for profiles and defined by JIS B0601:2001. In FIG. 8, a curve consisting of two adjacent mountain curve and reverse mountain curve is referred to as a profile element, and a width of a line segment of the horizontal axis corresponding to a width of the profile element is referred to as a width Xs. The mean width RSm is a mean value of the widths of the profile elements and expressed by the following expression (2). According to the JIS B0601:2001, surface roughness is assessed using a contact-type surface roughness meter, and in the expression (2), Xsi is defined to be 2.5 μm or more in accordance with resolution of the meter. However, the expression (2) holds true when Xsi is 2.5 μm or less. The measurement resolution by the scanning interferometry is about 0.1 μm and the expression (2) still holds true at Xsi about 0.1 μm.

Expression (2)

$$RSm = \frac{1}{m}\sum_{i=1}^{m} Xsi \quad (2)$$

The fθ lenses 105, 305 have an image height in proportion with an incidence angle of the light beam and move an image plane of the light beam deflected by the polygon mirror 104 with a fixed angular velocity to the Y axis with a constant speed.

The longitudinal direction of the reflective mirrors 106A, 106B is the Y-axis direction and they return the light beam having passed the fθ lens 105 and guide it to the toroidal lenses 107A, 107B, respectively. Likewise, the longitudinal direction of the reflective mirrors 306C, 306D is the Y-axis direction and they return the light beam having passed through the fθ lens 305 and guide it to the toroidal lenses 307C, 307D, respectively (See FIGS. 2 and 3).

The longitudinal direction of the toroidal lens 106A, 106B is the Y-axis direction and they are securely supported by a support plate 110A whose both ends are fixed to the housing 15. The toroidal lens 107A guides the light beam returned from the reflective mirror 106A to the reflective mirror 108A with the longitudinal direction as the Y-axis direction, thereby forming an image on the photoconductive drum 30A (See FIGS. 2 and 3).

Figure 3:
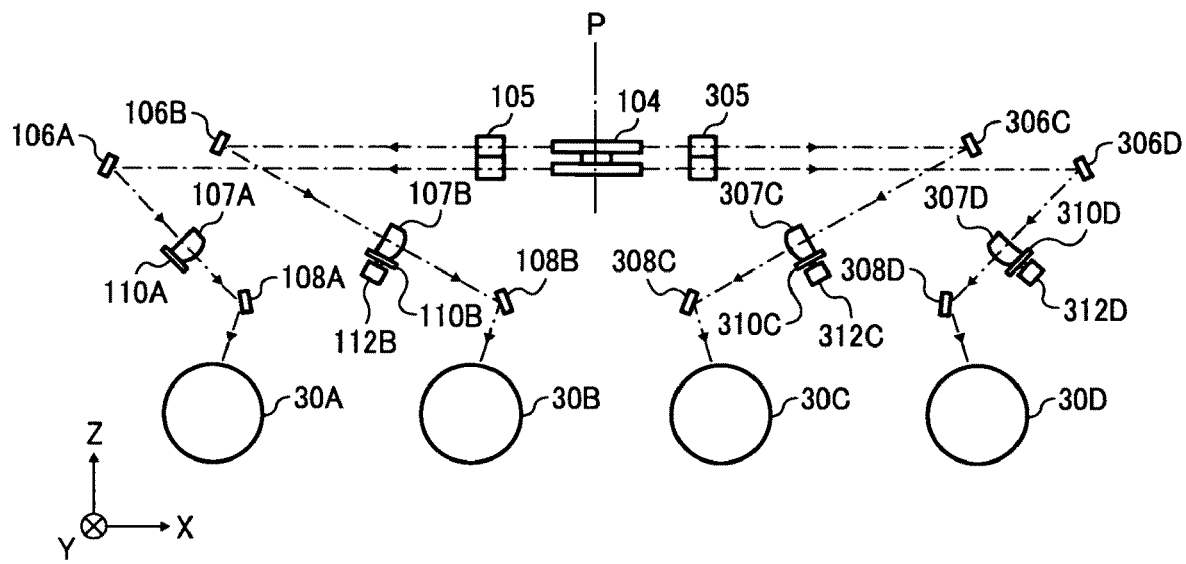
FIG. 3 is a side view of the optical scan apparatus 100 according to the first embodiment of the present invention.

The longitudinal direction of the toroidal lens 107B is the Y-axis direction, and it is fixed to the housing 15 at one end (Y-axis direction) and securely supported at the other end (the reverse Y-axis direction) by a support plate 110B which is supported by a drive mechanism 112B with a rotation motor and a feed screw mechanism, for example (FIG. 3). The toroidal lens 107B guides the light beam returned from the reflective mirror 106B to the reflective mirror 108B with the longitudinal direction as the Y-axis direction, thereby forming an image on the photoconductive drum 30B.

Likewise, the longitudinal direction of the toroidal lens 307C is the Y-axis direction, and it is fixed to the housing 15 at one end (Y-axis direction) and securely supported at the other end (the reverse Y-axis direction) by a support plate 310C which is supported by a drive mechanism 312C with a rotation motor and a feed screw mechanism, for example (FIG. 3). The toroidal lens 307C guides the light beam returned from the reflective mirror 306C to the reflective mirror 308C with the longitudinal direction as the Y-axis direction, thereby forming an image on the photoconductive drum 30C.

The longitudinal direction of the toroidal lens 307D is the Y-axis direction, and it is fixed to the housing 15 at one end (Y-axis direction) and securely supported at the other end (the reverse Y-axis direction) by a support plate 310D which is supported by a drive mechanism 312D with a rotation motor and a feed screw mechanism, for example (FIG. 3). The toroidal lens 307D guides the light beam returned from the reflective mirror 306[) to the reflective mirror 308D with the longitudinal direction as the Y-axis direction, thereby forming an image on the photoconductive drum 30D.

Optical sensors 141A, 141B are disposed near one end (at a side on which light beam is incident) of the toroidal lenses 107A, 107B in the Y-axis direction, and optical sensors 142A, 14213 are disposed near the other end thereof in the reverse Y-axis direction. Also, optical sensors 142C, 142D are disposed near one end (at a side on which light beam is incident) of the toroidal lenses 307C, 307D in the Y-axis direction, and optical sensors 141C, 141D are disposed near the other end thereof in the reverse Y-axis direction. The optical sensors 141A to 141D and 142A to 142D output signals which are turned on while detecting the light beam and turned off while not detecting the light beam, for example.

Next, the operation of the image formation apparatus 10 including the optical scan apparatus 100 as configured above will be described. Upon receiving image information from the high-level device or the like, the light source unit 201 of the optical incidence system 200A emits a plurality of light beams and the splitter prism 202 vertically splits each of the light beams into two. The two split light beams pass through the liquid crystal elements 203A, 2031B, respectively and their positions are thereby corrected in the sub scan direction. Then, the cylindrical lenses 204A, 204B gather the light beams on the deflection surface of the polygon mirror 104. The light beams deflected by the polygon mirror 104 are incident on the fθ lens 105.

The upper one of the light beams incident on the fθ lens 105 is reflected by the reflective mirror 106B and incident on the toroidal lens 107B. The toroidal lens 107B gathers the light beam via the reflective mirror 108B on the surface of the photoconductive drum 30B. Also, the lower one of the light beams incident on the fθ lens 106 is reflected by the reflective mirror 106A and incident on the toroidal lens 107A. The toroidal lens 107A gathers the light beam via the reflective mirror 108A on the surface of the photoconductive drum 30A. The deflection surfaces of the polygon mirror 104 have a vertical phase difference of 45 degrees as described above. Therefore, in synchronization with signals output from the optical sensors 141A, 141B, 142A, 142B, the photoconductive drum 30B is scanned with the upper light beam and the photoconductive drum 30A is scanned with the lower beam in the reverse Y-axis direction alternatively.

Similarly, the light source unit 201 of the optical incidence system 200B emits a plurality of light beams and the splitter prism 202 vertically splits each of the light beams into two. The two split light beams pass through the liquid crystal elements 203A, 208B, respectively and their positions are thereby corrected in the sub scan direction. Then, the cylindrical lenses 204A, 204B gather the light beams on the deflection surface of the polygon mirror 104. The light beams deflected by the polygon mirror 104 are incident on the fθ lens 305.

The upper one of the light beams incident on the fθ lens 305 is reflected by the reflective mirror 306C and incident on the toroidal lens 307C. The toroidal lens 307C gathers the light beam via the reflective mirror 308C on the surface of the photoconductive drum 30C. Also, the lower one of the light beams incident on the fθ lens 105 is reflected by the reflective mirror 306D and incident on the toroidal lens 307D. The toroidal lens 307D gathers the light beam via the reflective mirror 308D on the surface of the photoconductive drum 30D. The deflection surfaces of the polygon mirror 104 have a vertical phase difference of 45 degrees as described above. Therefore, in synchronization with signals output from the optical sensors 141C, 141D, 142C, 142D, the photoconductive drum 30C is scanned with the upper light beam and the photoconductive drum 30D is scanned with the lower beam in the Y-axis direction alternatively.

The photoconductive layers on the surfaces of the photoconductive drum 30A, 30B, 30C, 30D are charged with the electric chargers 32A, 32B, 32C, 32D at a predetermined voltage, therefore, electric charges are distributed at a fixed density thereon. When the photoconductive drums 30A, 30B, 30C, 30D are scanned with the light beams, portions of the photoconductive layers on which the light beams are gathered become conductive and the electric potential of the portions is substantially zero. Accordingly, by scanning the photoconductive drums 30A, 30B, 30C, 30D rotating in the direction indicated by the arrows in FIG. 1 with the light beams modulated according to the image information, electrostatic latent images represented by distributed charges are formed thereon.

The developer rollers of the toner cartridges 33A, 33B, 33C, 33D in FIG. 1 supply toners to the electrostatic latent images on the surfaces of the photoconductive drums 30A, 30B, 30C, 30D, respectively. At this point, since the developer rollers of the toner cartridges 33A, 33B, 33C, 33D) are charged with a voltage of reverse polarity of that of the photoconductive drum 30A, 30B, 30C, 30D, the toners attached to the developer rollers are charged with the same polarity of that of the photoconductive drum 30A, 30B, 30C, SOD. Because of this, the toners are not attached to the portions on which the electric charges are distributed but only attached to the portions at the zero potential scanned with the light beams. Thereby, the electrostatic latent images are visualized as toner images on the surfaces of the photoconductive drum 30A, 30B, 30C, 30D.

As described above, the respective toner images formed by the first to fourth stations according to image information are superimposedly transferred on the surface of the transfer belt 40. The toner images transferred on the transfer belt 40 are transferred by the transfer charger 48 onto the paper sheets 61 extracted from the paper feed tray 60 and fused by the fuse roller 50. The paper sheets 61 with the images thereon are discharged by the discharge roller 58 and stacked up sequentially in the discharge tray 15a.

As described heretobefore, according to the optical scan apparatus 100 of the first embodiment, the mean width RSm of profile elements of a cross section of the deflection surface of the polygon mirror 104 in the sub scan direction is set to be smaller than the distance b between the spots of the light beams adjacent to each other in the sub scan direction thereof. This makes it possible to prevent a variation in the size and shape of the spots of the light beams which occurs due to the undulation or unevenness on the deflection surface, and to scan scanning planes in a short period of time with a high precision. Especially, it is advantageous for scanning with a large number of light beams at once that final images are formed of dots of a fixed size, resulting in avoiding the decrease of granularity of the images effectively.

Figure 9:
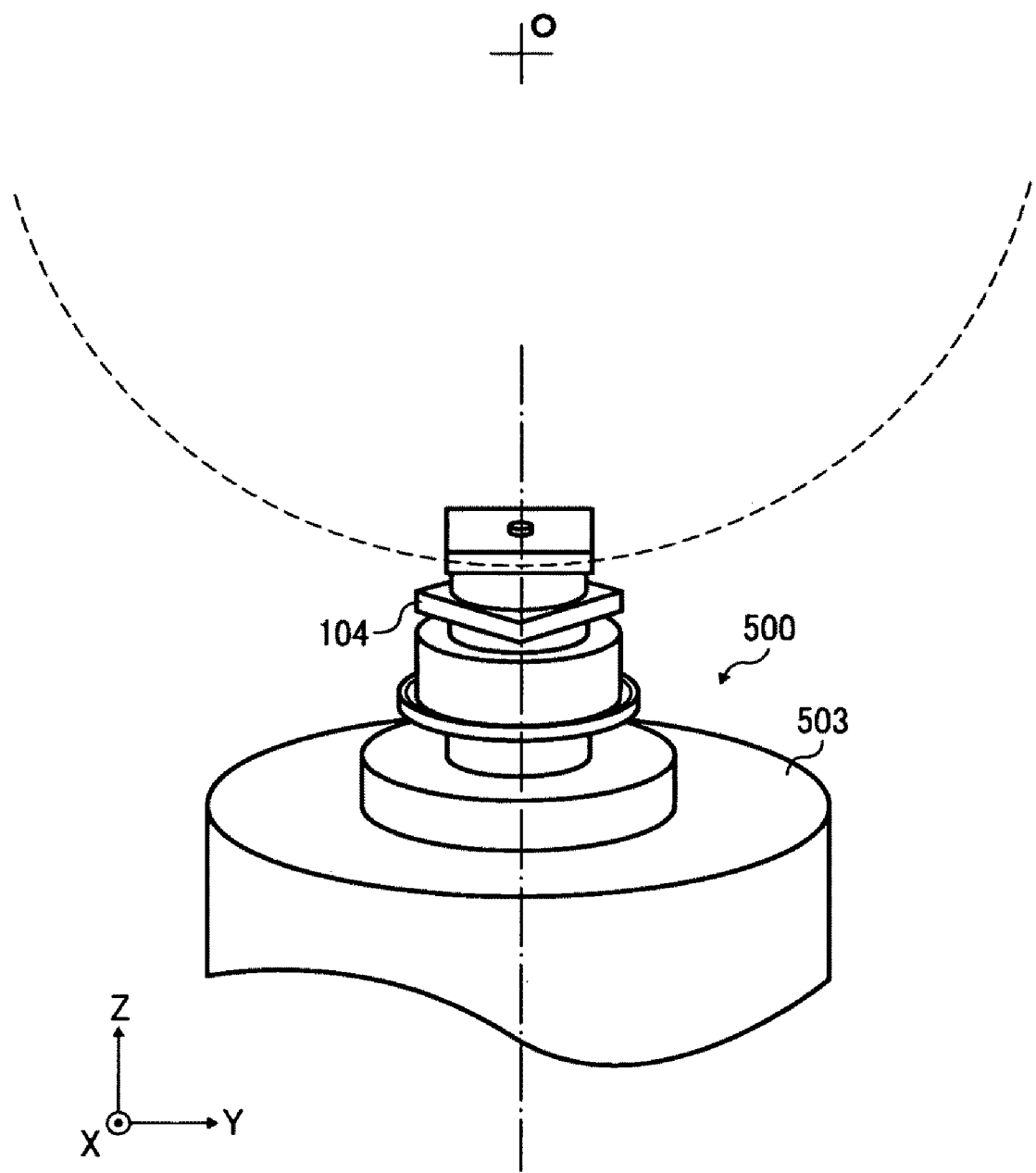
FIG. 9 is a perspective view of a cutting machine 500 which cuts the deflection surface of the polygon mirror 104 according to the first embodiment of the present invention.
Figure 10:
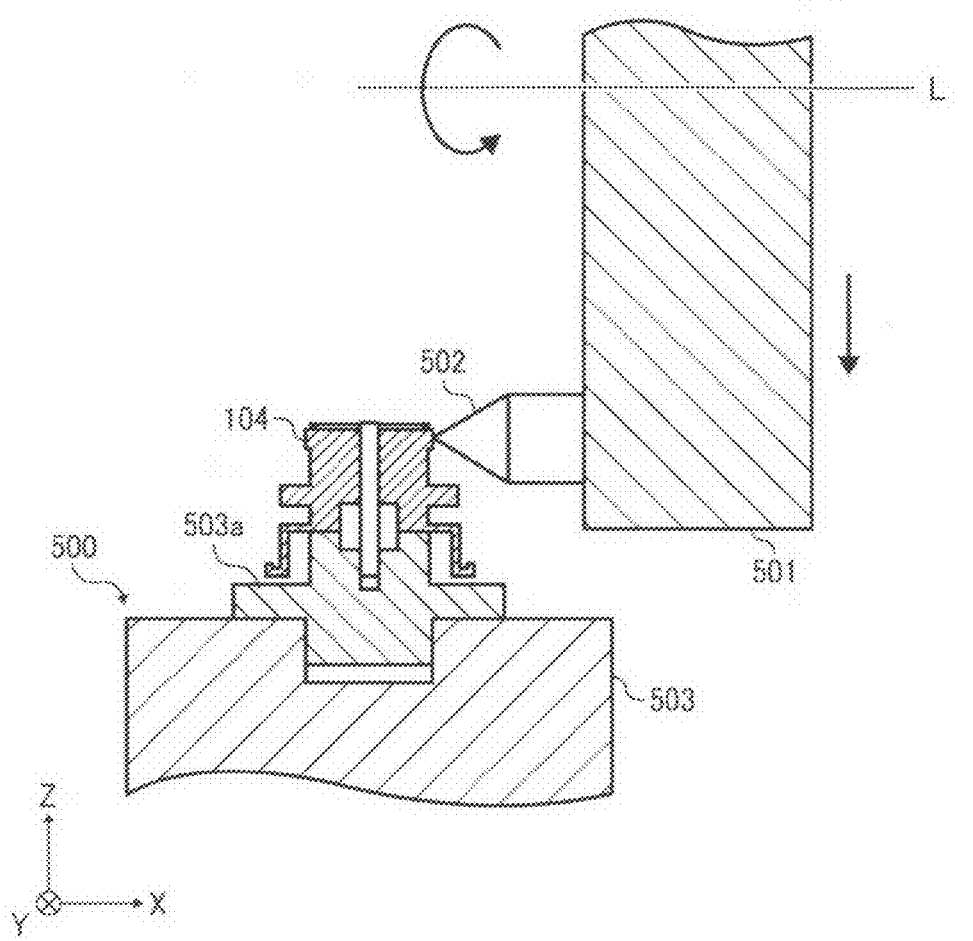
FIG. 10 is a cross sectional view of the cutting machine 500 which cuts the deflection surface of the polygon mirror 104 according to the first embodiment of the present invention.
Figure 11:
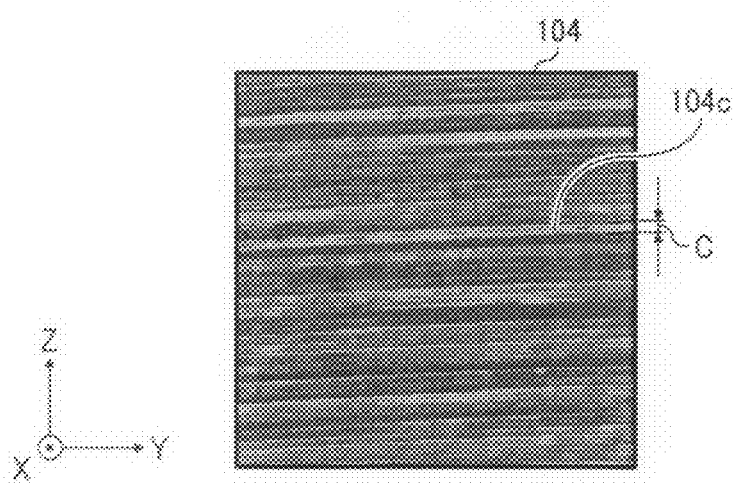
FIG. 11 is an enlarged view of the deflection surface of the polygon mirror 104 by the scanning interferometry according to the first embodiment of the present invention.

Note that there are various methods for forming the deflection surfaces of the polygon mirror 104. With reference to FIGS. 9 to 11, one example thereof will be described. FIG. 9 is a perspective view of the polygon mirror 104 and the schematic main structure of a cutting machine 500 for processing deflection surfaces of the polygon mirror 104. FIG. 10 is a cross sectional view of the cutting machine 500 of FIG. 9. Hereinafter, a description will be made on an example where a mirror surface is formed on a rough deflection surface of a substantially complete form of the polygon mirror 104.

As shown in FIGS. 9 and 10, the cutting machine 500 includes a fixation device which is composed of a disc member 501 rotating around an L axis in parallel with the X axis, a cutting tool 502 rotating around the L axis by rotation of the disc member 501, a retainer 503a retaining the polygon mirror 104 so that the rotation axis of the polygon mirror 104 is to be in parallel with the Z axis.

In the cutting machine 500, while the fixation device 503 is gradually carried in the vertical direction (Z-axis direction), the disc member 501 is rotated to rotate the cutting tool 502 at a rotation speed R[rpm] per minute along a broken line in FIG. 9, for example. Thereby, the cutting tool 502 cuts the deflection surface of the polygon mirror 104 in a direction substantially parallel to the Y-axis direction. The entire deflection surface is cut by repeating the above operation plural times. On the deflection surface, accordingly, cutting traces are made substantially in the main scan direction as the longitudinal direction and they are adjacent to each other in the sub scan direction.

Note that "a direction substantially parallel to the Y-axis direction" signifies that a blade of the cutting tool 502 rotating around the L axis makes a trajectory substantially in parallel with the Y-axis direction on the deflection surface. When the radius of the rotation of the cutting tool 502 is relatively larger, for example, five to ten times greater than the length of the deflection surface in the sub scan direction, it can be said that the cutting tool 502 makes a substantially linear movement on the deflection surface.

FIG. 11 is an enlarged view of the deflection surface processed by the cutting machine 500 according to the scanning interferometry. As seen in FIG. 11, cutting traces 104c are formed on the deflection surface in a direction substantially parallel to the main scan direction (Y-axis direction).

The cutting traces cause a problem, in the optical scan apparatus with multiple laser beams which has a wider deflection field (illumination area) than one with a single laser beam, that the deflection field is formed over plural cutting traces so that the light beams are scattered at the edges of the cutting traces, which may cause formation of ghost images. In order to avoid this problem from occurring, in the present embodiment, the deflection surface of the polygon mirror 104 is cut in the direction substantially parallel to the main scan direction, and a cutting width c of the cutting tool 502 in the sub scan direction if set to be larger than a distance B (c>B) (see FIG. 6) between a beam spot at a top end and a beam spot at a bottom end of the deflection surface in the sub scan direction.

This enables the light beams to be incident on the same cutting trace of the deflection surface and to prevent the light beams from scattering at the edges of the cutting traces. For example, with the laser array 152 according to the present embodiment, the distance B between the beam spot at a top end and the beam spot at a bottom end of the deflection surface in the sub scan direction, in other words, the illumination area, is set to 15 μm, and the cutting width c on the deflection surface is set to 20 μm. Therefore, the scattering of the laser beams at the edges of the cutting traces is preventable.

Furthermore, the cutting width c [mm] is expressed by the following expression (3) where the per-minute rotation speed of the cutting tool 502 is R[rpm], a moving speed of the polygon mirror 104 in the sub scan direction on the deflection surface is q [mm/min]:

$$c=(60/R)\times(q/60)=q/R \quad (3)$$

Therefore, when the distance B is smaller than the cutting width c of the cutting tool 502 in the sub scan direction, that is, a relation B<q/R is satisfied) it is possible to avoid the light beam from scattering at the edges of the cutting traces.

Further, the image formation apparatus according to the present embodiment includes the optical scan apparatus 100. Therefore, it is possible to scan with the light beams whose spots are uniform in size and shape, and to form images with high precision consequently.

Note that the laser array 152 is used for the light source in the present embodiment, however, the light source is not limited thereto. Any light source can achieve similar effects as long as it is formed monolithically.

The present embodiment has described the image formation apparatus 10 with the photoreceptors 30A to 30D, however, the present invention is not limited thereto. The present invention is applicable to an image formation apparatus forming mono-color images by scanning a single photoreceptor with plural light beams, for example. Further, the present embodiment has described an example where the optical scan apparatus 100 is used in a printer, however, the optical scan apparatus 100 is applicable to other image formation apparatuses besides a printer such as a copier, a facsimile machine, or a combination of the above apparatuses.

Second Embodiment

Hereinafter, the second embodiment of the present invention will be described with reference to FIGS. 12 to 15.

Figure 12:
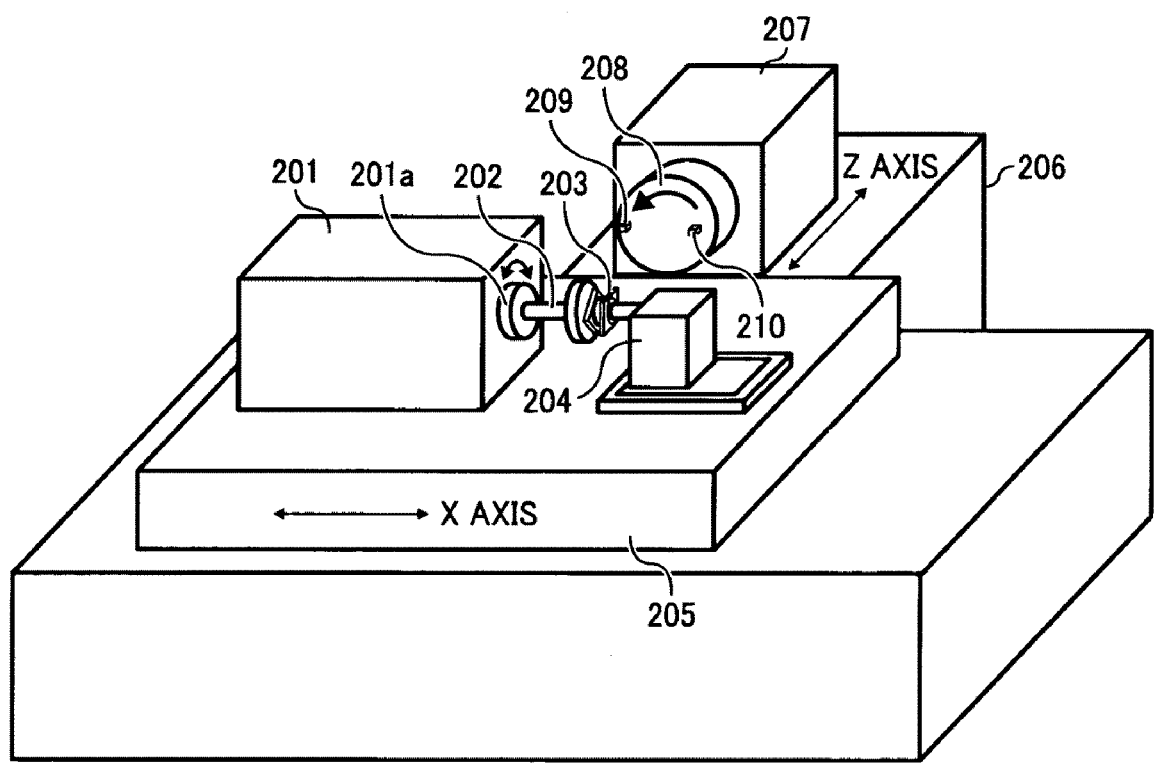
FIG. 12 is a perspective view of a polygon mirror processing apparatus according to a second embodiment of the present invention.

FIG. 12 shows the basic structure of the polygon mirror processing apparatus according to the present embodiment. In FIG. 12, a fixation jig 202 is mounted on an indexing disc 201a of an indexing fixture 201. The fixation jig 202 can be positioned with a high accuracy by rotation of the indexing disc 201a so that each of the surfaces of the polygon mirror can be set at a cutting position.

An upper holding jig 204 opposite to the fixation jig 202 is disposed so as to sandwich and fix a work 203 therebetween. The indexing fixture 201 and upper holding jig 204 are fixed on an X-axis stage 205 which is movable in a rotation axis direction of the indexing fixture 201, to be movable in the X-axis direction.

In the back side of FIG. 12, a Z-axis stage 206 is disposed and movable in a direction perpendicular to the X-axis stage 205. A spindle 207 with a main rotation axis is mounted as a rotary driver on the Z-axis stage 206. It is movable in the Z-axis direction.

A substantially circular cutter holder 208 is fixed as a support body to the main rotation axis of the spindle 207, and has a rough bit 209 as a rough cutting member and a finish bit 210 as a finish cutting member attached thereto. The rough bit 209 is fixed near the outer circumference of the cutter holder 208, and the finish bit 210 is fixed more closely to the inner circumference than the rough bit 209 with a phase shift of 180 degrees relative to the rough bit 209. The balance of the cutter holder 208 is adjusted such that vibrations during the rotation thereof due to the fixed positions of the rough and finish bits 209, 210 can be suppressed. The polygon mirror as an object of the process can be cut by rotating the rough bit 209 or finish bit 210.

Figure 13:
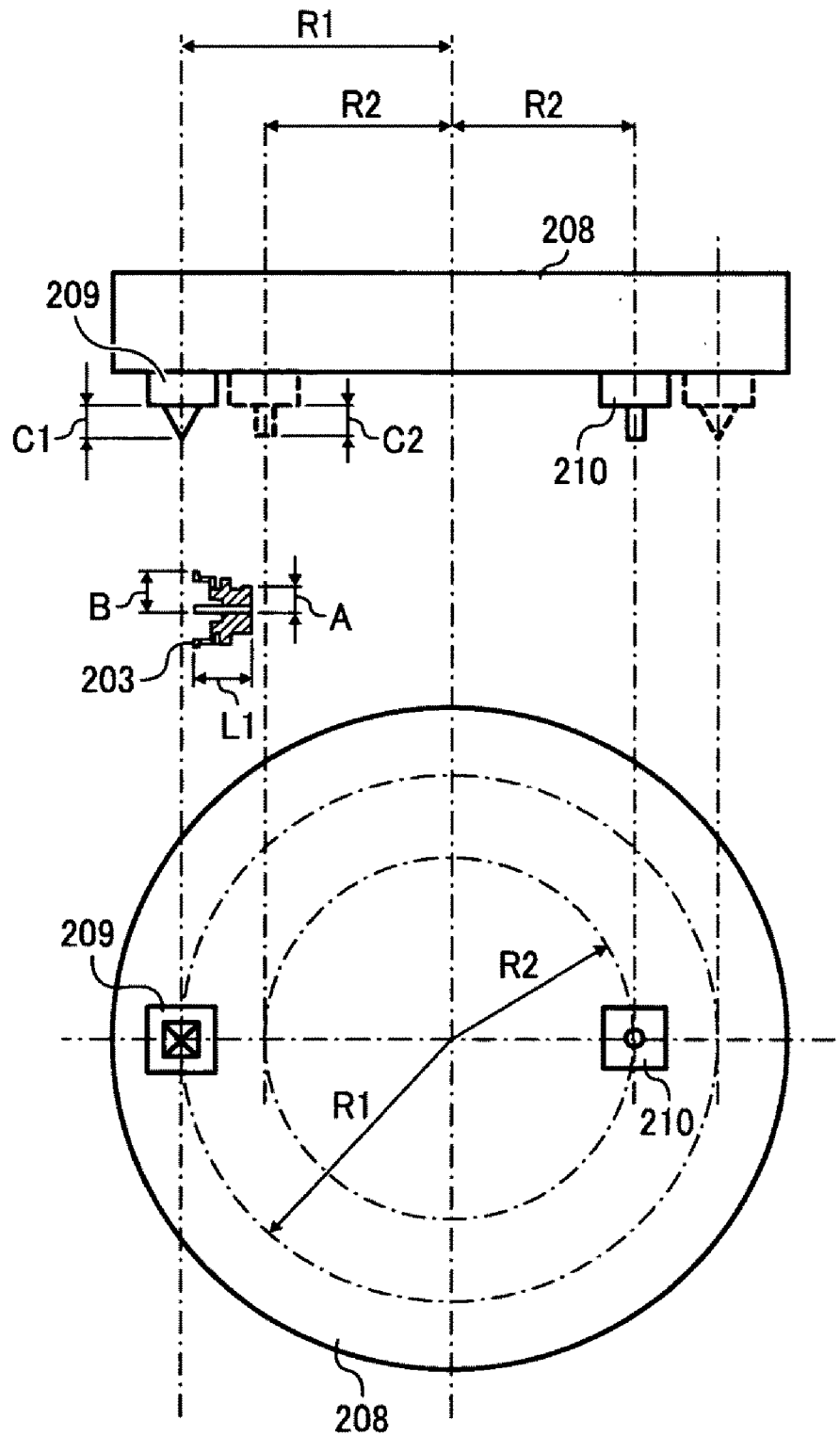
FIG. 13 is a plan view (upper part) and a front view (lower part) showing positions of a rough bit (rough cutting member) and a finish bit (finish cutting member) on a cutter holder of the polygon mirror processing apparatus according to the second embodiment of the present invention.
Figure 14A:
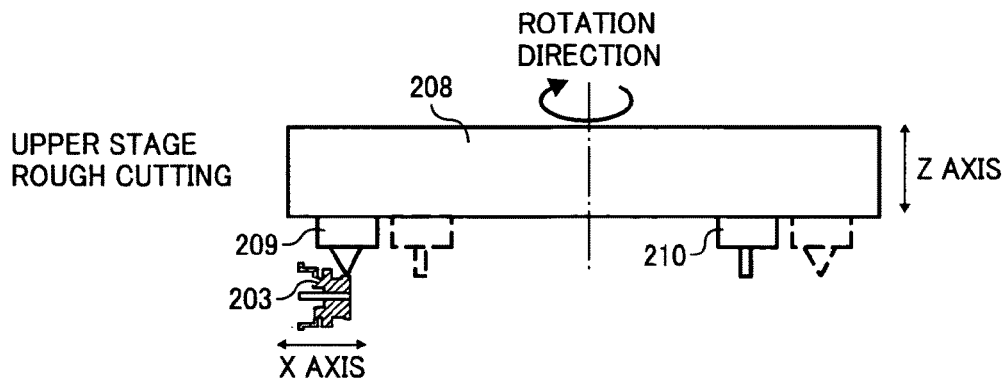
FIGS. 14A to 14D show operational steps of the polygon mirror processing apparatus according the second embodiment of the present invention and shows a positional relation in each step between the rough bit and the finish bit and a work to be processed.
Figure 14B:
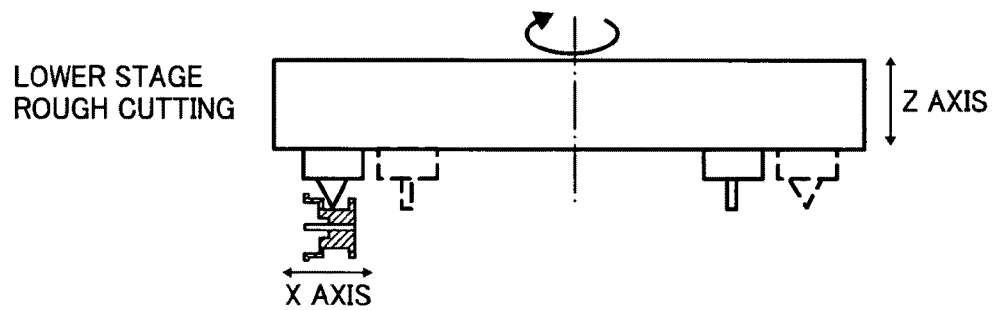
Figure 14C:
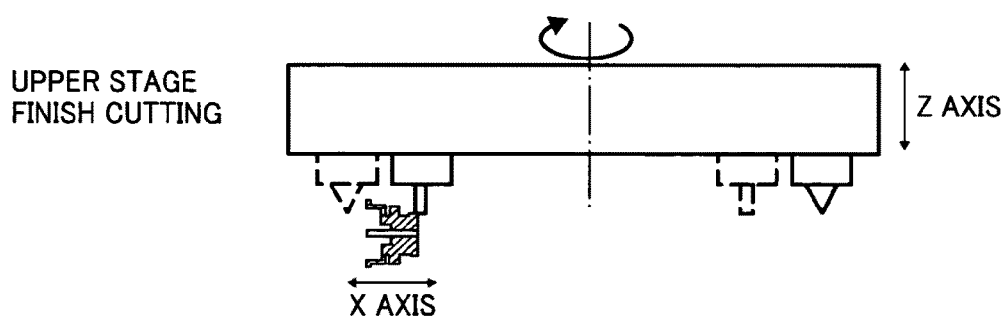
Figure 14D:
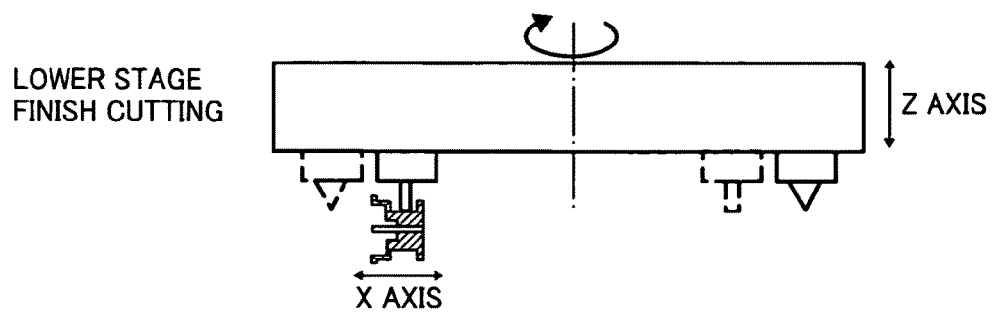

FIG. 13 shows positions at which the rough bit 209 and the finish bit 210 are fixed on the cutter holder 208. Hereinafter, the rough bit 209 and finish bit 210 are to be collectively referred to as bits for the sake of simplicity. The fixed positions of the bits 209, 210 are decided so that one of them not operating does not interfere with the work 203. That is, a difference between a radius of the fixed rough bit 209 (distance between the center of the cutter holder 208 and the center of the rough bit 209) and a radius of the fixed finish bit 210 (distance between the center of the cutter holder 208 and the center of the finish bit 210) is set to be larger than a length of the work 203 in the rotation axis direction. The work 203 is a polygon mirror integrated with a later-described flange portion.

Specifically, the rough bit 209 and finish bit 210 are fixed at such positions on the cutter holder 208 as to satisfy the following expression (4):

$$R1-R2>L1$$

where the length of the work 203 in the rotation axis direction is L1 [mm], the radius of the fixed rough bit 209 on the cutter holder 208 is R1 [mm], and the radius of the fixed finish bit 210 thereon is R2 [mm].

Also, in order to prevent the work 203 from interfering with the bits except their tip portions, lengths of the tip portions of the rough bit 209 and the finish bit 210 are set so that the respective amounts of projection thereof are to be larger than a difference between a radius of a portion of the work 203 with a maximum outer diameter around the rotation axis and a distance from the rotation axis to the deflection surface (radius of an inscribed circle of the polygon mirror).

Specifically, where a distance from a rotation axis of the work 203 to the deflection surface is A [mm], a radius of a portion of the work 203 with a maximum outer diameter around the rotation axis is B [mm], and an amount of projection of a tip portion of the rough bit 209 is C1, and an amount of projection of a tip portion of the finish bit 210 is C2, the following expressions (6) and (6) are satisfied.

$$C1 > B - A \quad (5)$$

$$C2 > B - A \quad (6)$$

Figure 21:
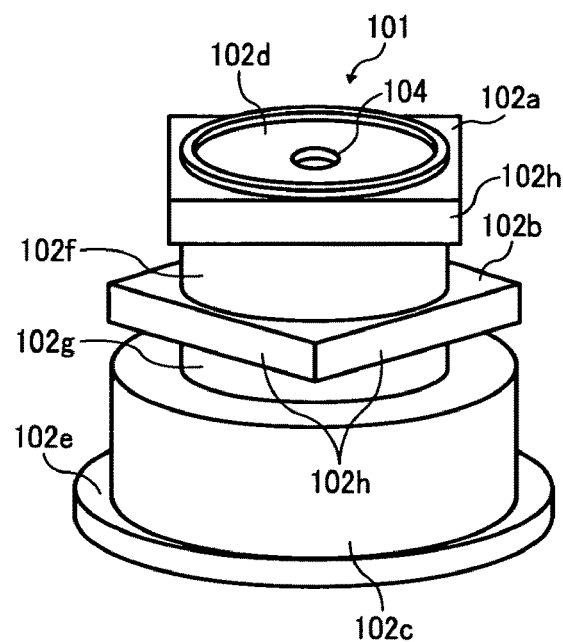
FIG. 21 is a perspective view of the optical deflector of the polygon mirror processing apparatus according the fourth embodiment of the present invention.

Moreover, in order to prevent other portions of the rough bit 209 and finish bit 210 than the tip portions from interfering with the work 203, cylindrical connecting portions which are more concave than the deflection surface are provided between an upper polygon mirror as the first polygon mirror and a lower polygon mirror as the second polygon mirror and between the lower polygon mirror and the motor (flange portion), respectively (FIG. 21).

Figure 15:
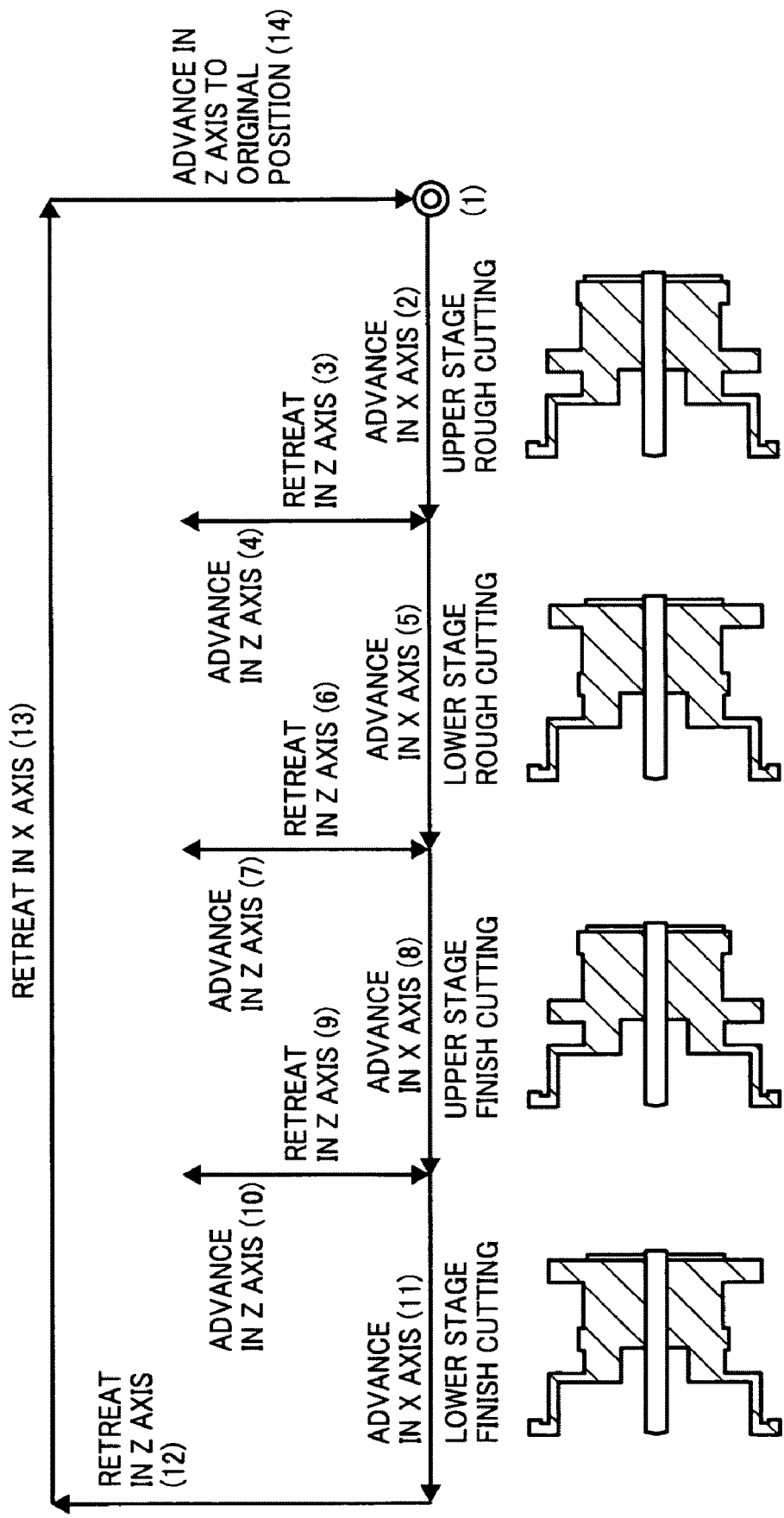
FIG. 15 shows operational steps of the polygon mirror processing apparatus according the second embodiment of the present invention and shows movements of the rough bit and the finish bit and a state of the work to be processed in each step.

With reference to FIG. 14 showing a positional relationship between the bits and the work 203 during the cutting process and to the operation flow in FIG. 15, a description will be made on a processing method for a plurality of polygon mirrors which are superimposedly disposed and integrated with a phase difference in the rotation direction.

1. Rough Cutting of First Deflection Surface of Upper Polygon Mirror (1) The indexing disc 201a on which the work 203 is fixed is rotated and the first deflection surface of the upper polygon mirror is set at a cutting position.
(2) The cutter holder 208 is rotated while the X-axis stage 205 is advanced in the X-axis direction, and the rough bit 209 roughly cuts the first deflection surface of the upper polygon mirror.
(3) Upon completion of the rough cutting for the first deflection surface, the spindle 209 is retreated (evacuated) in the Z-axis direction to such a position that the rough bit 209 does not get in contact with the work 203.

2. Rough Cutting of First Deflection Surface of Lower Polygon Mirror (4) The indexing disc 201a on which the work 203 is fixed is rotated and the first deflection surface of the lower polygon mirror is set at a cutting position. Then, the spindle 207 is advanced from the retreated position in the Z-axis direction so that the rough bit 209 is set at the cutting position.
(5) The cutter holder 208 is rotated while the X-axis stage 205 is advanced in the X-axis direction, and the rough bit 209 roughly cuts the first deflection surface of the lower polygon mirror.
(6) Upon completion of the rough cutting for the first deflection surface, the spindle 207 is retreated (evacuated) in the Z-axis direction to such a position that the rough bit 209 does not get in contact with the work 203.

3. Finish Cutting of First Deflection Surface of Upper Polygon Mirror (7) The indexing disc 201a on which the work 203 is fixed is rotated and the roughly cut first deflection surface of the upper polygon mirror is set at a cutting position. Next, the spindle 207 is advanced from the retreated position in the Z-axis direction so that the finish bit 210 is set at the cutting position.
(8) The cutter holder 208 is rotated while the X-axis stage 205 is advanced in the X-axis direction, and the finish bit 210 finish-cuts the first deflection surface of the upper polygon mirror.
(9) Upon completion of the finish cutting for the first deflection surface, the spindle 207 is retreated (evacuated) in the Z-axis direction to such a position that the finish bit 210 does not get in contact with the work 203.

4. Finish Cutting of First Deflection Surface of Lower Polygon Mirror

(10) The indexing disc 201a on which the work 203 is fixed is rotated and the roughly cut first deflection surface of the lower polygon mirror is set at a cutting position. Next, the spindle 207 is advanced from the retreated position in the Z-axis direction so that the finish bit 210 is set at the cutting position.
(11) The cutter holder 208 is rotated while the X-axis stage 205 is advanced in the X-axis direction, and the finish bit 210 finish-cuts the first deflection surface of the lower polygon mirror.
(12) Upon completion of the finish cutting for the first deflection surface, the spindle 207 is retreated (evacuated) in the Z-axis direction to such a position that the finish bit 210 does not get in contact with the work 203.
(13) The X-axis stage 205 is retreated in the X-axis direction.
(14) The spindle 207 is advanced in the Z-axis direction to an original cutting start position.

As described above, the mirror-cutting for deflection surfaces of the upper and lower polygon mirrors are completed through repetition of the operations in (1) to (14).

The features of the present embodiment are to provide a process in which the rough bit 209 is moved (retreated) between the rough cutting process by the rough bit 209 and the finish-cutting process by the finish bit 210, thereby preventing the interference of the work 203 with the bits. That is, the mirror-cutting of the deflection surfaces according to the present embodiment includes at least four steps of identifying of a deflection surface to be processed, roughly cutting the deflection surface by the rough bit 209, moving (retreating) the rough bit 209, and finish-cutting the deflection surface by the finish bit 210.

Furthermore, for processing two-stage polygon mirrors superimposedly disposed in the rotation axis direction and having the deflection surfaces in the two stages shifted by a predetermined angle, the processing according to the present embodiment includes a first step of identifying a deflection surface to be processed of a first stage polygon mirror, a second step of roughly cutting the deflection surface by the rough bit, a third step of moving (retreating) the rough bit, a fourth step of identifying a deflection surface to be processed of a second stage polygon mirror, a fifth step of roughly cutting the deflection surface of the second stage polygon mirror by the rough bit, a sixth step of moving (retreating) the rough bit, a seventh step of identifying a deflection surface to be processed of the first stage polygon mirror, an eighth step of finish-cutting the deflection surface of the first stage polygon mirror, a ninth step of moving (retreating) the finish bit, a tenth step of identifying the deflection surface to be processed of the second stage polygon mirror, and an eleventh step of finish-cutting the deflection surface of the second stage polygon mirror by the finish bit, and a twelfth step of moving (retreating) the finish bit.

According to the polygon mirror processing apparatus and method in the present embodiment, it is possible to mirror-cut (rough cutting and finish cutting), in one chuck (single work retention), without interrupting the cutting process, the polygon mirrors superimposedly disposed in two stages in the rotation axis direction and with the deflection surfaces shifted from each other in the two stages by a predetermined angle. This makes it possible to make uniform the angle of the deflection surfaces of the polygon mirrors relative to the rotation axis and to form high-precision deflection surfaces.

In addition, since the deflection surfaces can be evenly cut, it is possible to form an optical deflector with less vibration and less noise.

Third Embodiment

Figure 18:
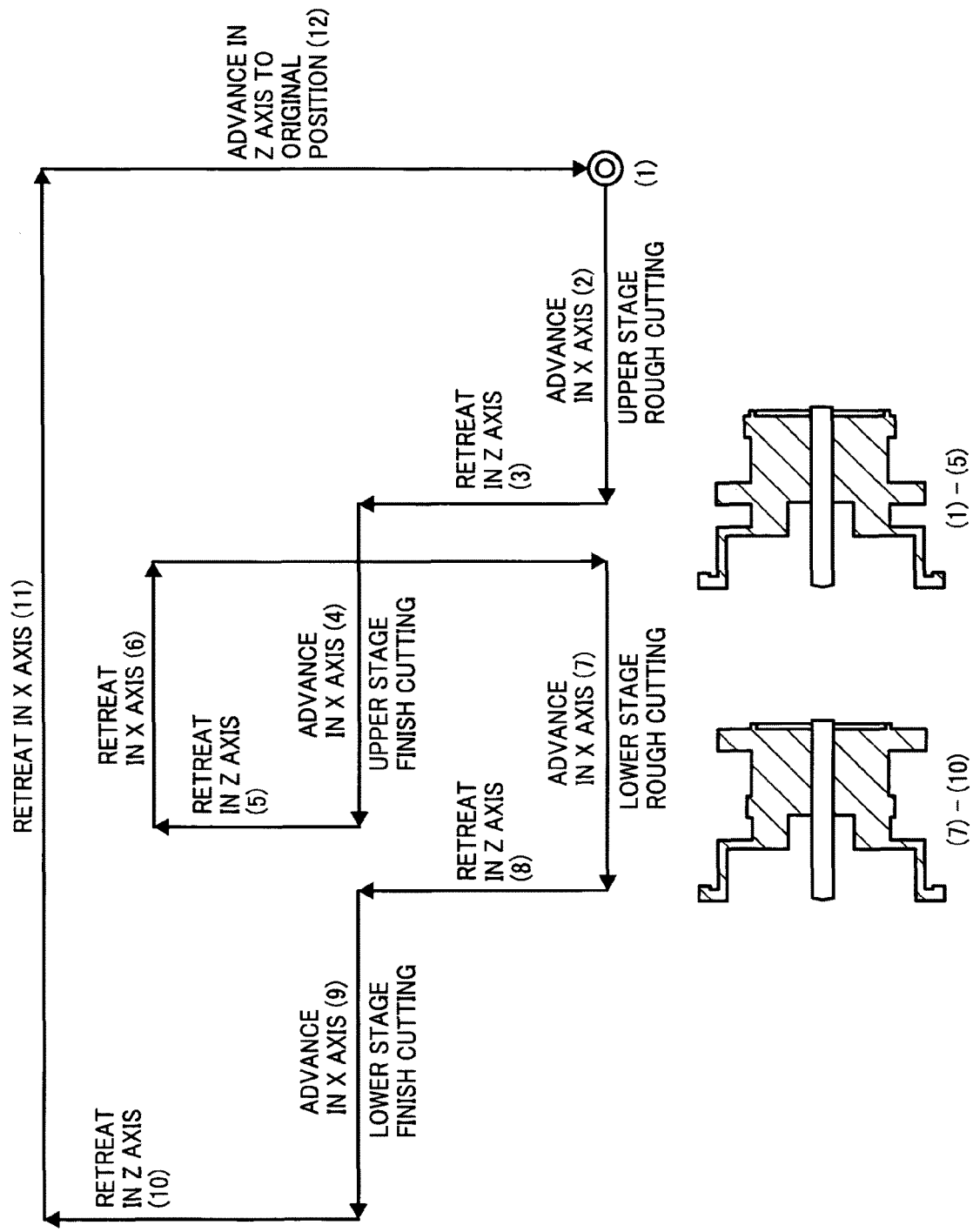
FIG. 18 shows operational steps of the polygon mirror processing apparatus according the third embodiment of the present invention and shows movements of the rough bit and the finish bit and a state of the work to be processed.

A polygon mirror processing apparatus according to a third embodiment will be described with reference to FIGS. 16 to 18. Note that the same components thereof as those of the second embodiment will be given the same numeric codes and a description on the structure and function thereof will be omitted unless needed. Only the main feature thereof will be described.

The basic structure of the polygon mirror processing apparatus according to the third embodiment is substantially the same as that according to the second embodiment except a positional relationship between the rough bit 209 and the finish bit 210 attached to the cutter holder 208 and a part of the cutting operation.

Figure 16:
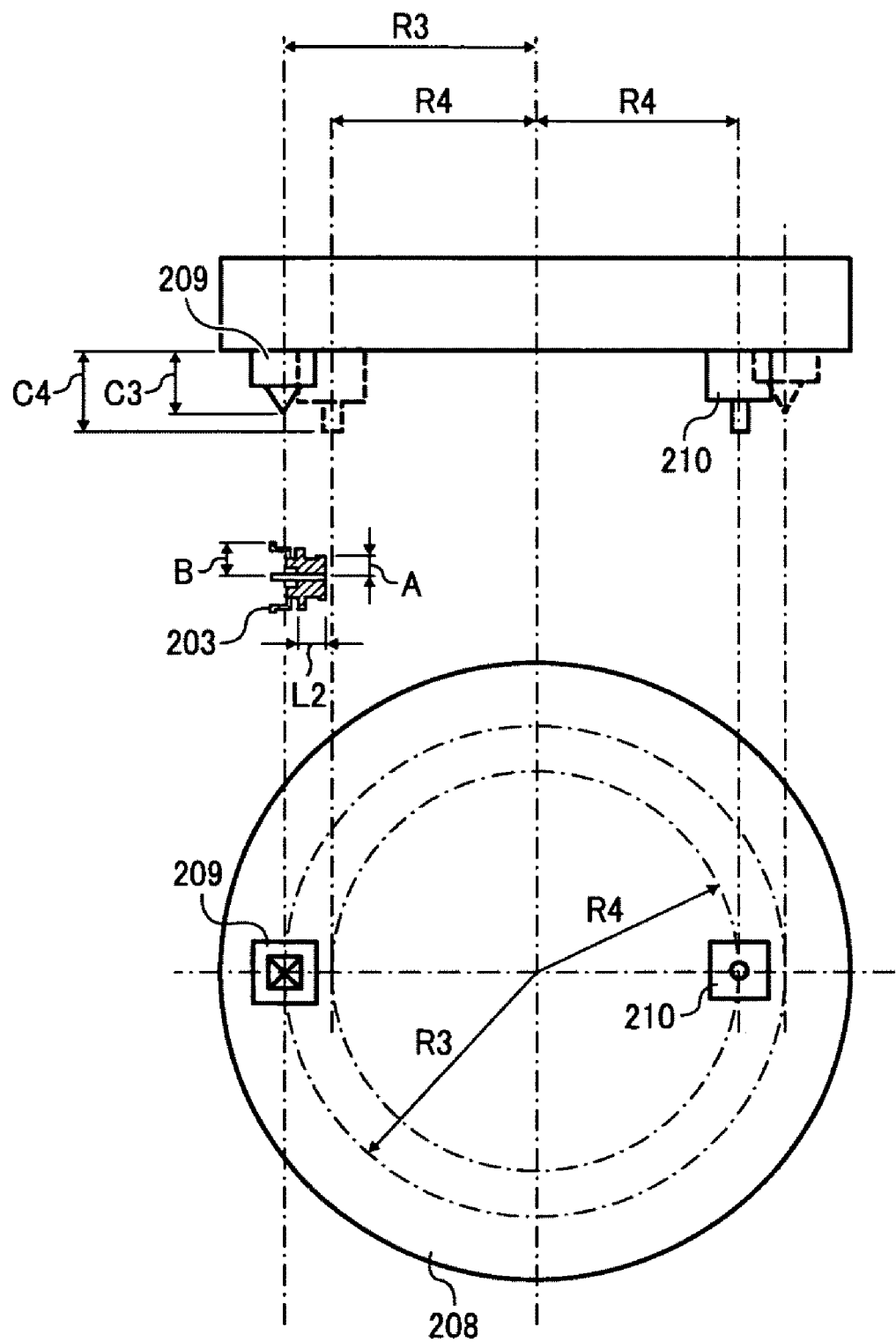
FIG. 16 is a view (upper part) and a front view (lower part) showing positions of a rough bit (rough cutting member) and a finish bit (finish cutting member) on a cutter holder of the polygon mirror processing apparatus according to a third embodiment of the present invention.
Figure 17A:
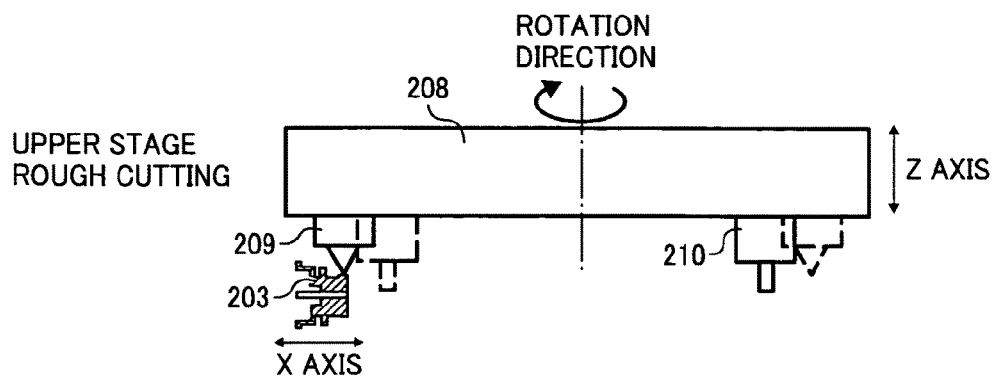
FIGS. 17A to 17D show operational steps of the polygon mirror processing apparatus according the third embodiment of the present invention and show a positional relation in each step between the rough bit and the finish bit and a work to be processed.
Figure 17B:
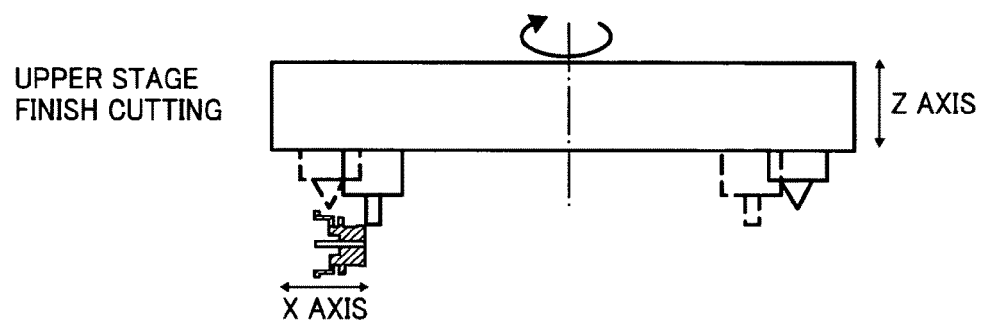
Figure 17C:
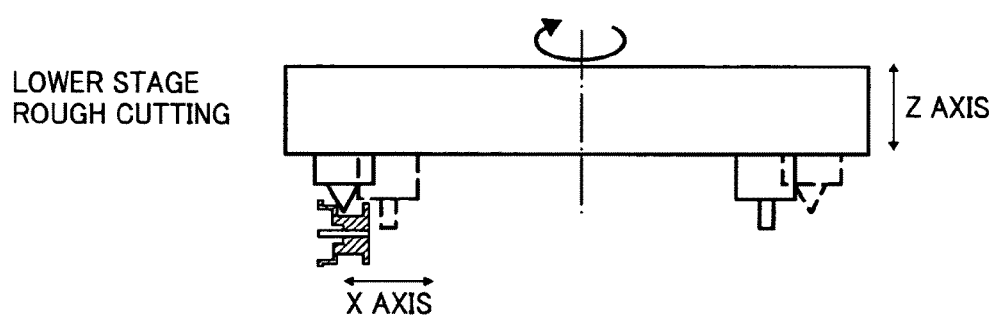
Figure 17D:
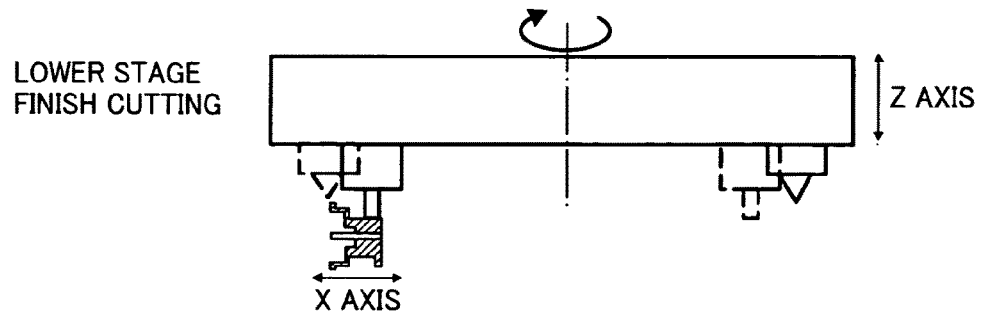

FIG. 16 shows positions at which the rough bit 209 and the finish bit 210 are attached on the cutter holder 208 according to the present embodiment. In the present embodiment as shown in FIG. 16, in order to prevent the bit not in the cutting operation from interfering with the work 203 (polygon mirror integrated with the flange portion), a difference in the amounts of projection from the cutter holder 208 between the rough bit 209 and the finish bit 210 is set to be larger than a difference between a radius of a portion of the work 203 with a maximum outer diameter around the rotation axis and a distance from the rotation axis to the deflection surface (radius of an inscribed circle of the polygon mirror).

That is, the following expression (7) is satisfied:

$$C4-C3>B-A$$

where a distance from a rotation axis of the work 203 to the deflection surface is A [mm], a radius of a portion of the work 203 with a maximum outer diameter around the rotation axis is B [mm], an amount of projection of the rough bit 209 from the cutter holder 208 is C3 [mm], and an amount of projection of the finish bit 210 from the cutter holder 208 is C4 [mm].

Moreover, a difference between a radius of the fixed rough bit 209 (distance between the center of the cutter holder and that of the rough bit 209) and a radius of the fixed finish bit 210 (distance between the center of the cutter holder 208 and that of the finish bit 210) is set to be larger than a length of the polygon mirror of the work 203 in the rotation axis direction.

That is, the rough bit 209 and the finish bit 210 are fixed on cutter holder 208 so as to satisfy the following expression (8):

$$R3-R4>L2$$

where a length of the polygon mirror in the work 203 in the rotation axis direction is L2 [mm], a radius of the fixed rough bit 209 is R3 [mm], and a radius of the attached finish bit 210 is R4 [mm], as shown in FIG. 16.

In order to prevent other portions of the rough bit 209 and finish bit 210 than the cutting portions from interfering with the work 203, cylindrical connecting portions which are more concave than the deflection surfaces are provided between the upper polygon mirror and the lower polygon mirror and between the lower polygon mirror and the flange portion containing the motor, respectively, which will be described in the fourth embodiment.

Next, with reference to FIG. 17 showing a positional relationship between the bits and the work 203 during the cutting process and to the operation flow in FIG. 18, a description will be made on a processing method for a plurality of integrated polygon mirrors which are superimposedly disposed with a phase difference in the rotation direction.

1. Rough Cutting of First Deflection Surface of Upper Polygon Mirror (1) The indexing disc 201a on which the work 203 is fixed is rotated and the first deflection surface of the upper polygon mirror is set at a cutting position.

(2) The cutter holder 208 is rotated while the X-axis stage 205 is advanced in the X-axis direction, and the rough bit 209 roughly cuts the first deflection surface of the upper polygon mirror.

(3) Upon completion of the rough cutting for the first deflection surface, the cutter holder 208 is retreated in the Z-axis direction to such a position that the rough bit 209 does not get in contact with the work 203. Then, the cutter holder 208 is rotated to set the finish bit 210 at the cutting position.

2. Finish Cutting of First Deflection Surface of Upper Polygon Mirror (4) The cutter holder 208 is rotated while the X-axis stage 205 is advanced in the X-axis direction, and the finish bit 210 finish-cuts the first deflection surface of the upper polygon mirror.

(5) Upon completion of the finish cutting for the first deflection surface, the spindle 207 is retreated (evacuated) in the Z-axis direction to such a position that the finish bit 210 does not get in contact with the work 203.

3. Rough Cutting of First Deflection Surface of Lower Polygon Mirror (6) The indexing disc 201a on which the work 203 is fixed is rotated while the X-axis stage 205 is retreated, and the first deflection surface of the lower polygon mirror is set at a cutting position.

(7) The cutter holder 208 is rotated while the X-axis stage is advanced in the X-axis direction, and the rough bit 209 roughly cuts the first deflection surface of the lower polygon mirror.

(8) Upon completion of the rough cutting for the first deflection surface, the spindle 207 is retreated (evacuated) in the Z-axis direction to such a position that the rough bit 209 does not get in contact with the work 203. Then, the cutter holder 208 is rotated to set the finish bit 210 at the cutting position.

4. Finish Cutting of First Deflection Surface of Lower Polygon Mirror (9) The cutter holder 208 is rotated while the X-axis stage 205 is advanced in the X-axis direction, and the finish bit 210 finish-cuts the first deflection surface of the lower polygon mirror.

(10) Upon completion of the finish cutting for the first deflection surface, the spindle 207 is retreated (evacuated) in the Z-axis direction to such a position that the finish bit 210 does not get in contact with the work 203.

(11) The X-axis stage 205 is retreated in the X-axis direction.

(12) The spindle 207 is advanced in the Z-axis direction to an original cutting start position.

As described above, the mirror-cutting for the deflection surfaces of the upper and lower polygon mirrors are completed through repeating the operations in (1) to (12) for all of the deflection surfaces thereof.

Similarly to the second embodiment, the feature of the present embodiment is to provide a process in which the rough bit 209 is moved (retreated) between the rough cutting process by the rough bit 209 and the finish-cutting process by the finish bit 210, thereby preventing the interference of the work 203 and the bits. That is, the mirror-cutting of the deflection surfaces according to the present embodiment includes at least four steps of identifying of a deflection surface to be processed, roughly cutting the deflection surface by the rough bit 209, moving (retreating) the rough bit 209, and finish-cutting the deflection surface by the finish bit 210.

Furthermore, for processing two-stage polygon mirrors superimposedly disposed in the rotation axis direction and the deflection surfaces shifted from each other in the two stages by a predetermined angle, the processing according to the present embodiment includes a first step of identifying a deflection surface to be processed of a first stage polygon mirror, a second step of roughly cutting the deflection surface by the rough bit, a third step of moving (retreating) the rough bit, a fourth step of finish-cutting the deflection surface of the first stage polygon mirror, a fifth step of moving (retreating) the finish bit, a sixth step of identifying a deflection surface to be processed of the first stage polygon mirror, a seventh step of roughly cutting the deflection surface of the second stage polygon mirror by the rough bit, an eighth step of moving (retreating) the rough bit, a ninth step of finish-cutting the deflection surface of the second stage polygon mirror by the finish bit, and a tenth step of moving (retreating) the finish bit.

According to the polygon mirror processing apparatus and method in the present embodiment, it is possible to mirror-cut (rough cutting and finish cutting), in one chuck (single work retention), without interrupting the cutting process, the polygon mirrors superimposedly disposed in the rotation axis direction and with the deflection surfaces shifted from each other by a predetermined angle. This makes it possible to make uniform the angle of the deflection surfaces of the polygon mirror relative to the rotation axis and to form high-precision deflection surfaces. In addition, since the deflection surfaces can be evenly cut, it is possible to form an optical deflector with less vibration and less noise.

Note that the positions and structure of the rough bit 209 and the finish bit 210 according to the second embodiment can be combined with those according to the third embodiment.

Fourth Embodiment

Figure 19:
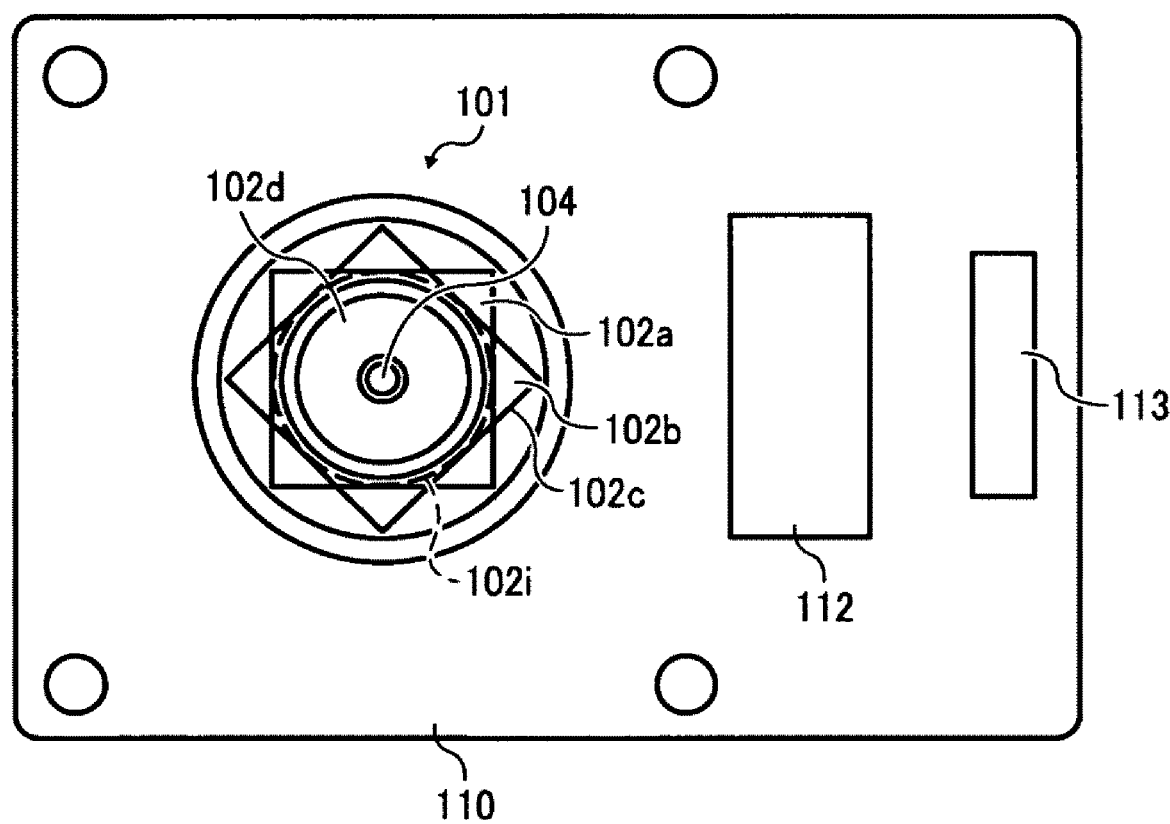
FIG. 19 is a plan view of the optical deflector of the polygon mirror processing apparatus according a fourth embodiment of the present invention.
Figure 20:
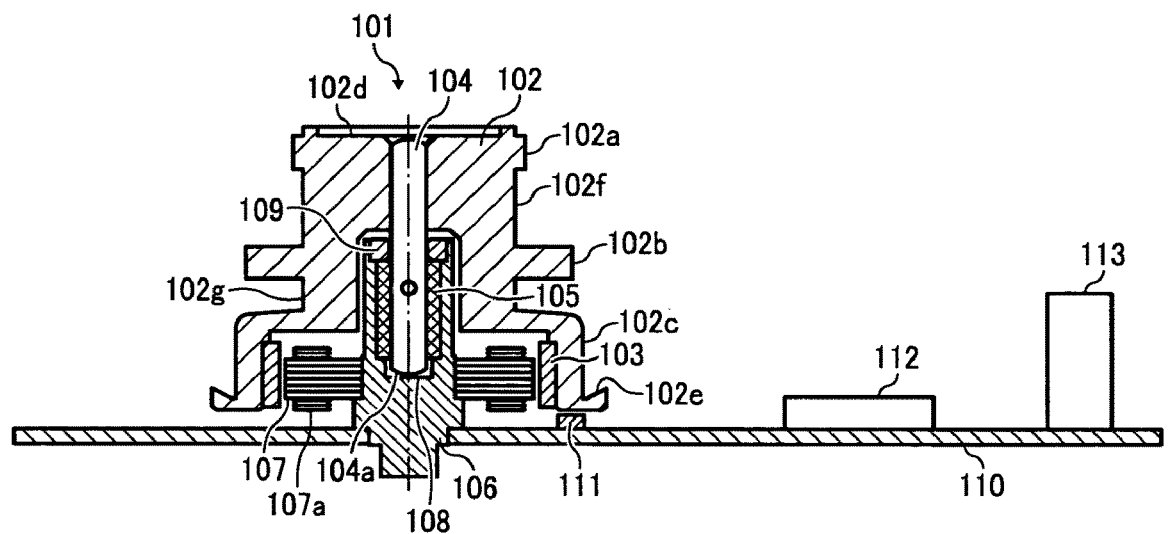
FIG. 20 is a cross sectional view of the optical deflector of the polygon mirror processing apparatus according the fourth embodiment of the present invention.

Next, with reference to FIGS. 19 to 21, an optical deflector according to the fourth embodiment will be described. FIG. 19 is a plan view of a rotary body as the optical deflector, FIG. 20 is a cross sectional side view of the rotary body, and FIG. 21 is a perspective view of the rotary body.

The rotary body 101 as the optical deflector is constituted of an upper polygon mirror 102a, a lower polygon mirror 102b, and a flange 102c supporting a rotor magnet 103. The rotary body 101 is shrink-fitted to the outer circumference of a rotation axis 104.

The radial bearing 105 is an oil-impregnated dynamic pressure bearing, and a gap thereof is set to be 10 μm or less in the diameter. In order to secure a stable high-speed rotation of the rotary body 102, the radial bearing is provided with a not-shown dynamic pressure groove. Generally, the dynamic pressure groove is provided in the outer circumference of the rotation axis 104 or the inner circumference of the radial bearing 105, however, it is preferable that it is provided in the inner circumference of the radial bearing 105 which is made of a sintered member with a good workability. The material of the rotation axis 104 is preferably a quenchable martensite stainless steel (for example, SUS420J2) because of its high surface hardness and anti-friction performance.

The rotor magnet 103 is fixed on the inner surface of a lower part of the flange 102c, and constitutes a brushless motor of an outer rotor type together with a stator core 107 (winding coil 107a) fixed to a bearing housing 106. The rotor magnet 103 is a bond magnet using a resin as a binder and is supported at its outer diameter portion by the flange 102c for the purpose of preventing destruction during the high-speed rotation due to centrifugal force.

A thrust bearing 108 in the axis direction faces a convex plane 104a formed on the bottom end of the rotation axis 104 and is a pivot bearing for receiving the convex plane 104. The thrust bearing 108 is preferably made of a martensite stainless steel, ceramics, a metal member whose surface is hardened through the DLC process (Diamond like Carbon) or the like, or a resin material, etc and has a good lubricating property. Because of this, it is able to suppress generation of powder particles due to the wear. The radial bearing 105 and the thrust bearing 108 are contained in the bearing housing 106, and oil leak therefrom is prevented by a fluid seal 109.

For rotating the rotary body 101 at a high speed of 25,000 rpm or more, it is necessary to adjust and maintain the balance of the rotary body 101 accurately so as to reduce the vibration thereof. The rotary body 101 has two balance adjusting portions in the upper and lower parts thereof. One is a concave circumferential portion 102d on the upper surface of the rotary body 101 and the other is a concave circumferential portion 102e of the flange 102c. The concave portions 102d, 102e are coated with respective adhesives for the balance adjustment. The amount of unbalance is needed to be 10 mg·mm or less, therefore, a difference in mass among portions on a radius of 10 mm is set to be maintained at 1 mg or less.

In a case where the balance adjustment through the coating the adhesives is difficult to achieve or the adhesives are exfoliated or dispersed at the rotation speed of 40,000 rpm or more since the amount thereof is too little and their adhesivities are weak, it is preferable to remove a part of a component of the rotary body by drilling, cutting or laser processing instead of performing such a minute adjustment.

The motor system according to the present embodiment is of an outer rotor type which radially has a magnetic gap and in which the rotor magnet 103 is laid out on the outer circumference of the stator core 107. The rotary body 101 is rotated by excitation switching of the winding coil 107a by a driver IC 112, referring to signals as position signals outputted from a hall element 111 mounted on a circuit board 110 due to a magnetic field of the rotor magnet 103. The rotor magnet 103 is radially magnetized and generates rotation torque for rotation between the outer circumference of the stator core 107. Magnetic paths of the rotor magnet 103 are open radially and vertically and the hall element 111 for excitation switching of the motor is disposed on the open magnetic paths.

The numeric code 113 represents a connector connected with a not-shown harness. Via the connector 113, power is supplied from exterior, the driving of the motor is stopped, or control signals for the rotation speed or the like are outputted/inputted.

The upper and lower polygon mirrors 102a, 102b are connected through a connecting portion 102f. The respective deflection surfaces of the upper and lower polygon mirrors 102a, 102b are fixed with a shift of 45 degrees (phase difference) in the rotation direction.

Also, a connecting portion 102g is provided between the lower polygon mirror 102b and the flange 102c. In other words, the upper and lower polygon mirrors 102a, 102b are connected with the flange 102c as a part of the motor and integrated with the motor.

According to the present embodiment, between the upper and lower polygon mirrors 102a, 102b and between the lower polygon mirror 102b and the flange 102c, the connecting portions 102f, 102g are formed respectively in cylindrical shape more concaved to an inner diameter side than an inscribed circle 102i of the deflection surface 102h.

Note that the upper and lower polygon mirrors 102a, 102b are radially smaller in size than the motor. This is because the polygon mirrors are downsized for the purpose of reducing the materials of the rotary body 101 to decrease burdens on the environment and reducing windage loss caused by the rotation of the polygon mirrors to reduce noise and rotary energy thereof.

Accordingly, the upper and lower polygon mirrors 102a, 102b are disposed with a predetermined spicing in the rotation axis direction (vertical direction). With such a configuration, it is possible to prevent the polygon mirrors from interfering with the bits during the cutting process and to process the deflection surfaces 102h of the integrated upper and lower polygon mirrors 102, 102b.

The rotary body 101 as configured above can be formed with high precision with the deflection surface 102h shifted from each other by a predetermined angle in the rotation direction, after the upper and lower polygon mirrors 102a, 102b are shrink-fitted to the rotation axis 104. This can eliminate an incident such that the upper and lower polygon mirrors 102a, 102b are displaced from their original fixed positions due to thermic stress or acceleration/deceleration at stoppage or startup operation, disrupting the balance of the rotary body and increasing the vibration thereof.

To increase magnetic efficiency of the rotor magnet 103, the flange 102c as a support portion for the rotor magnet 103 can be formed of ferromagnetic materials and fixed to the upper and lower polygon mirrors 102a, 102b. However, it is more preferable to form the upper and lower polygon mirrors and the flange 102c as a single component using the same materials as in the present embodiment since it is possible to prevent the displacement of the upper and lower polygon mirrors 102a, 102b, and the flange 102c from their original fixed positions due to thermic stress or acceleration/deceleration at stoppage or startup operation, thereby preventing the disruption of the balance of the rotary body 101 and the increase of the vibration thereof.

Further, forming the connecting portions 102f, 102g in cylindrical shape makes it possible to reduce the windage loss thereof. It is also made easier to form the connecting portions, resulting in cost reduction.

Note that the rotary body 101 according to the present embodiment without the rotor magnet 103 is equivalent to the work 203 according to the second and third embodiments.

The present embodiment has described as a way of example the optical deflector in which the upper and lower polygon mirrors 102a, 102b are disposed with a phase difference of 45 degrees in the rotation direction, however, the present invention is not limited thereto. For example, the present invention is applicable to the mirror-cutting process for the deflection surfaces of polygon mirrors integrated with a motor when the polygon mirrors are smaller than the motor and a bit not in cutting operation interferes with the motor, that is, when the motor is the one to interfere with the cutting of the polygon mirrors.

Fifth Embodiment

Figure 22:
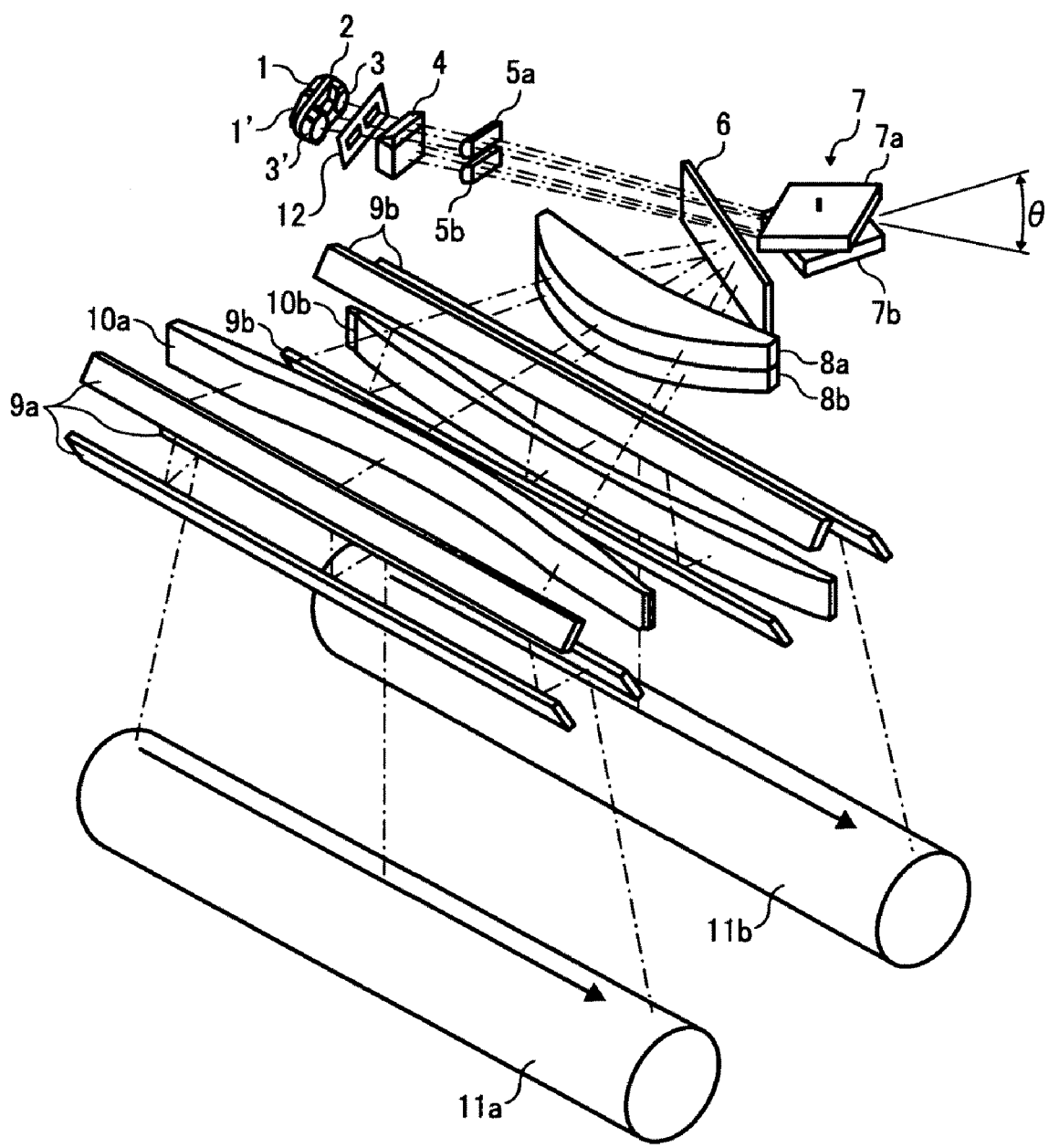
FIG. 22 is a perspective view of the optical scan apparatus according a fifth embodiment of the present invention.

Next, with reference to FIGS. 22 to 24, an optical scan apparatus using the optical deflector according to the fourth embodiment will be described. FIG. 22 shows a structure of the optical scan apparatus according to the present embodiment. In the drawing the numeric codes 1, 1' represent semiconductor lasers which constitute a single light source and each emits one light beam. They are supported by a holder 2 to keep a predetermined positional relation.

The light beams from the semiconductor lasers 1, 1' are converted by coupling lenses 3, 3' into light beams of a desired property (parallel light flux, light flux of weak divergence or of weak convergence) in accordance with the subsequent optical system. According to the present embodiment, the light beams are converted into parallel light fluxes by the coupling lenses 3, 3'.

Each light beam with a desired property emitted from the coupling lenses 3, 3' passes through an opening of an aperture 12 to adjust the widths of the light beams, and then incident on a splitter prism 4. Each light beam is split into two by the action of the splitter prism 4 in the sub scan direction.

Figure 23:
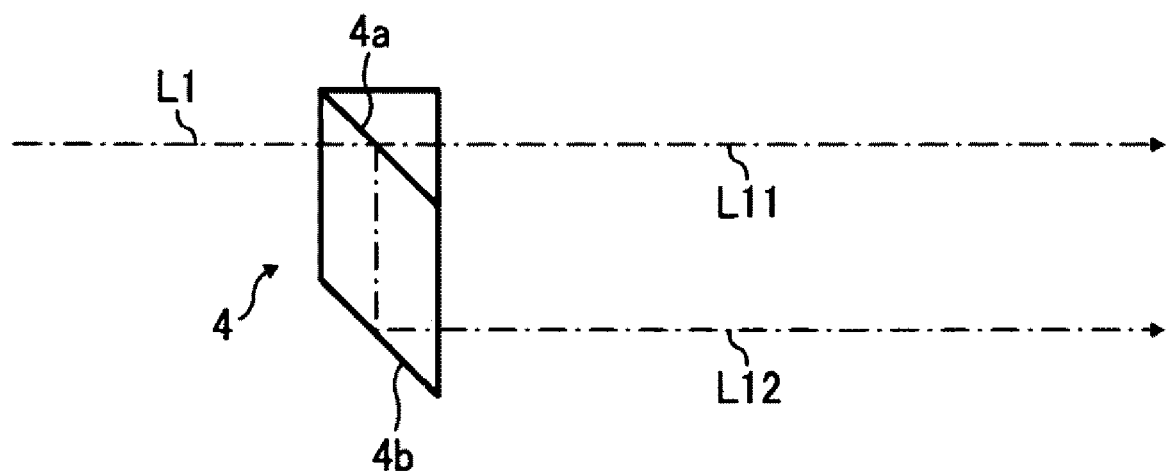
FIG. 23 is an explanatory view for functions of a light beam splitter in the optical scan apparatus according the fifth embodiment of the present invention.

FIG. 23 shows the light beam split into two. A vertical direction in FIG. 23 is the sub scan direction. For the sake of simplicity, the light beam L1 represents light beams emitted from the semiconductor laser 1. The splitter prism 4 has a half mirror 4a and a reflection surface 4b in parallel in the sub scan direction. The light beam L1 is incident on the half mirror 4a. A part of the light beam L1 straightly transmits through the half mirror 4a to be a light beam L11, and the rest of the light beam L1 is reflected by the half mirror 4a and incident on the reflection surface 4b, and totally reflected thereby and becomes a light beam L12.

The half mirror 4a and the reflection surface 4b are parallel to each other, therefore, the light beams L11, L12 emitted from the splitter prism 4 are parallel to each other. The light beam L1 is split into the two light beams L11, L12 in the sub scan direction. Similarly, the light beam from the semiconductor laser 17 is split into two. Two light beams are emitted from a single light source (m=1) and each of the two light beams are split into two (q=2) to obtain four light beams in total.

As shown in FIG. 22, the four light beams are incident on cylindrical lenses 5a, 5b and gathered thereby in the sub scan direction to form a linear image long in the main scan direction near the deflection surface of polygon mirrors of an optical deflector 7.

The light beams are emitted from the semiconductor lasers 1, 1' and split by the splitter prism 4, and a part thereof (light beam L11 in FIG. 23) straightly transmits through the half mirror 4a of the splitter prism 4 and is incident on the cylindrical lens 5a. A part (light beam L12 in FIG. 23) of the split light beams by the splitter prism 4 is reflected by the half mirror 4a and the reflection surface 4b, and incident on the cylindrical lens 5b.

The numeric code 6 in FIG. 22 represents a soundproof glass 6 provided in a window of a soundproof housing of the optical deflector 7. The four light beams from the light source are incident on the optical deflector 7 via the soundproof glass 6 and deflected thereby and emitted to an optical scan and image formation system via the soundproof glass 6. The optical deflector 7 as shown in FIG. 22 includes an upper polygon mirror 7a and a lower polygon mirror 7b so that they are superimposedly disposed in two stages and integrated with each other. The optical deflector 7 is rotated around a rotation axis by a not-shown drive motor.

According to the present embodiment, the upper and lower polygon mirrors 7a, 7b both have the same shape and have four deflection surfaces. However, the deflection surfaces of the lower polygon mirror 7b are shifted from those of the upper polygon mirror 7a by a predetermined angle θ (45 degrees) in the rotation direction.

Moreover, the numeric codes 8a, 8b represent fθ lenses, 10a, 10b represent toroidal lenses, 9a, 9b represent reflective mirrors, and 11a, 11b represent photoconductive drums as optical conductive photoreceptors in the drawing.

The fθ lens 8a, toroidal lens 10a reflective mirror 9a guide the two light beams (emitted from the semiconductor lasers 1, 1' and having passed through the half mirror 4a of the splitter prism 4) deflected by the upper polygon mirror 7a of the optical deflector 7 to the photoconductive drum 11a to be scanned, thereby constituting an optical scan and image formation system which forms two optical spots spaced in the sub scan direction.

Similarly, the fθ lens 8b, toroidal lens 10b, reflective mirror 9b guide the two light beams (emitted from the semiconductor lasers 1, 1' and reflected by the half mirror 4a of the splitter prism 4 and the reflection surface 4b) deflected by the lower polygon mirror 7b of the optical deflector 7 to the photoconductive drum 11b to be scanned, thereby constituting an optical scan and image formation system which forms two optical spots spaced in the sub scan direction.

The semiconductor lasers 1, 1' are arranged so that the light beams therefrom are crisscrossed with each other in the vicinity of deflection surface seen from the rotation axis direction of the optical deflector. Accordingly, the two light beams incident on the deflection surfaces have a divergence angle (made by a projection of the two light beams on a plane perpendicular to the rotation axis).

With the divergence angle, the respective two light spots on the photoconductive drums 11a, 11b are separated from each other in the main scan direction. Thus, it is able to individually detect the two light beams to scan the photoconductive drums 11a, 11b by an optical sensor and to synchronize the light beams for each light beam at start of scanning.

The photoconductive drum 11a is scanned with the two light beams deflected by the upper polygon mirror 7a of the optical deflector 7. Likewise, the photoconductive drum 11b is scanned with the two light beams deflected by the lower polygon mirror 7b of the optical deflector 7.

As described above, the deflection surfaces of the upper and lower polygon mirror 7a, 7b of the optical deflector 7 are shifted from each other by 45 degrees in the rotation direction. Because of this, when the photoconductive drum 11a is scanned with the light beams deflected by the upper polygon mirror 7a, the light beams deflected by the lower polygon mirror 7b are not guided to the photoconductive drum 11b. Similarly, when the photoconductive drum 11b is scanned with the light beams deflected by the lower polygon mirror 7b, the light beams deflected by the upper polygon mirror 7a are not guided to the photoconductive drum 11a.

Figure 24A:
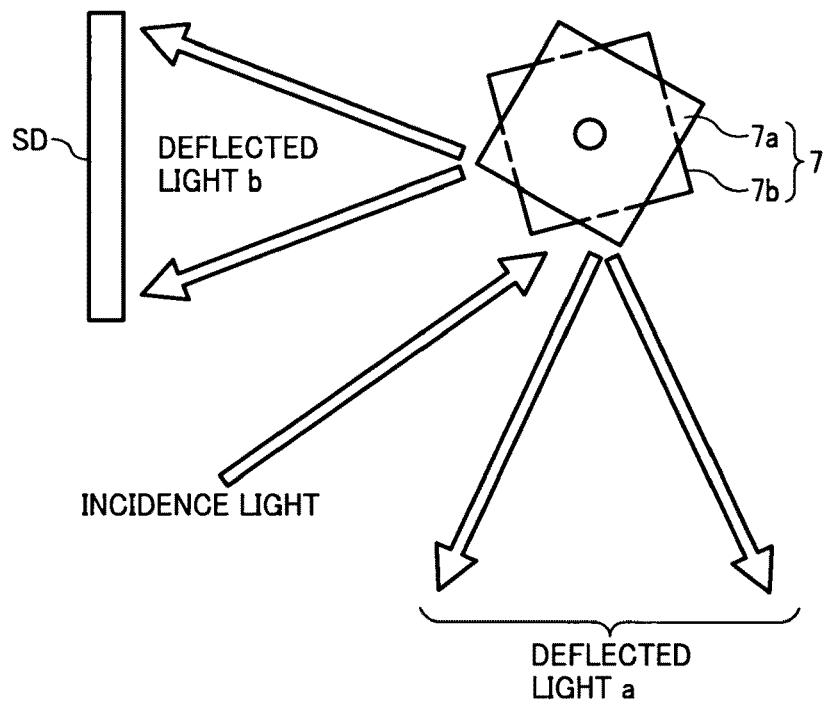
FIGS. 24A and 24B are explanatory views for scanning with a light beam from the optical deflector of the optical scan apparatus according the fifth embodiment of the present invention.
Figure 24B:
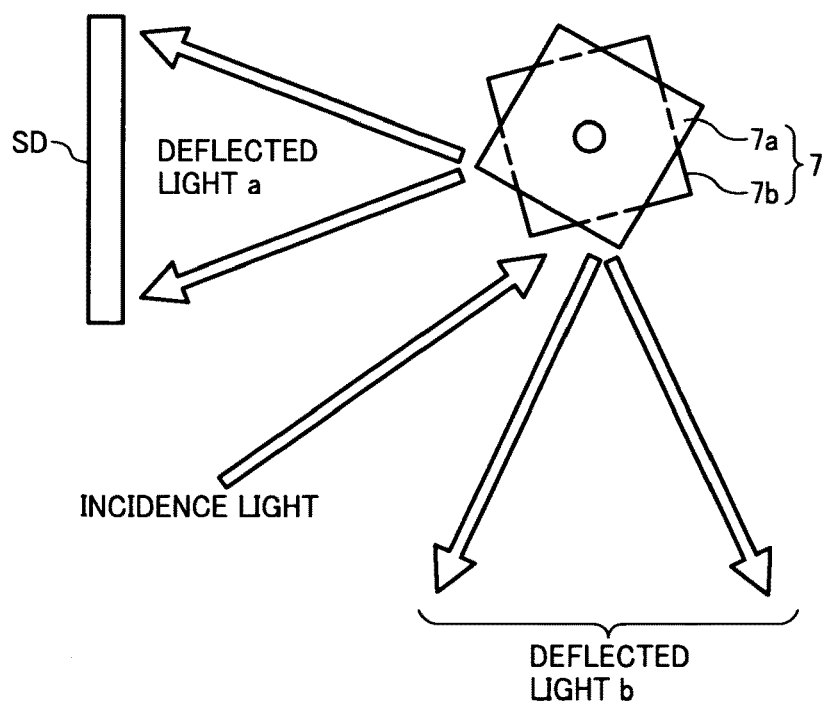

In other words, the photoconductive drums 11a, 11b are scanned with the light beams by turns with a time lag. FIGS. 24A, 24B show the above alternative scanning. In the drawing incidence light represents light beams incident on the optical deflector 7 (actually, four beams), and deflected lights a, b represent light beams deflected.

FIG. 24A shows the incidence light incident on the optical deflector 7, deflected by the upper polygon mirror 7a, and guided to the photoconductive drum 11a. The deflected light a by the lower polygon mirror 7b is not directed to the photoconductive drum 11b.

FIG. 24B shows the incidence light incident on the optical deflector 7, deflected by the lower polygon mirror 7b, and guided to the photoconductive drum 11b. The deflected light a by the lower polygon mirror 7a is not directed to the photoconductive drum 11a.

Here, in order to prevent the deflected light by one of the polygon mirrors from acting as a ghost light while the deflected light by the other of the polygon mirrors is guided to the photoconductive drum, it is preferable to employ a light shielding device SD in FIGS. 24A, 24B when appropriate, to shade the deflected light not to be guided to the photoconductive drum. Actually, this is very feasible by forming the internal walls of the above soundproof housing to be non-reflective.

As described above, according to the present embodiment, the photoconductive drums 11a, 11b are scanned with the light beams alternatively. Therefore, in scanning the photoconductive drum 11a, for example, light intensity of the light source is modulated with an image signal corresponding to a black color image, and in scanning the photoconductive drum 11b, the light intensity thereof is modulated with an image signal corresponding to a magenta color image. This enables formation of an electrostatic latent image of a black image on the photoconductive drum 11a, and formation of an electrostatic latent image of a magenta color image on the photoconductive drum 11b.

Figure 25:
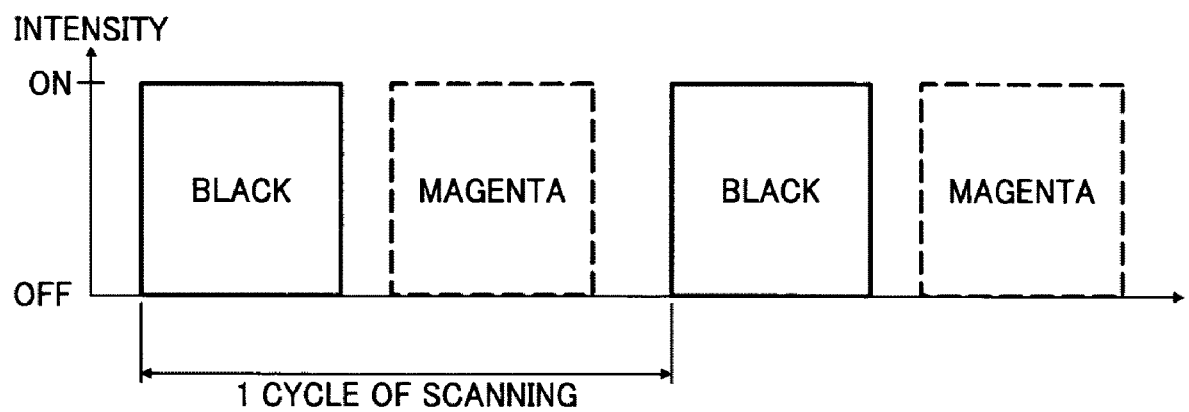
FIG. 25 is an explanatory view for scan timing with the light beam from the optical deflector of the optical scan apparatus according the fifth embodiment of the present invention.

FIG. 25 is a timing chart for writing, with a common light source (semiconductor lasers 1, 1' in FIG. 22) a black color image on the entire scanning area of the photoconductive drum 11a and a magenta color image on the entire scanning area of the photoconductive drum 11b. The frames of solid lines represent a write for the black color image and the frames of broken lines represent a write for the magenta color image. Note that the timing at which an image is written is determined by the optical sensor's (generally, photodiode) detecting the light beam, as described above.

The optical scan apparatus according to the present embodiment uses the optical deflector according to the fourth embodiment for the optical deflector 7. That is, it includes the high-precision polygon mirrors 80 that it is able to prevent the positions of the light beams from shifting. For this reason, warranty for optical property of the fθ lenses and toroidal lenses can be necessity minimum.

As a result, it is able to reduce the thickness of the fθ lenses and toroidal lenses as well as to improve a manufacturing rate for non-defective lenses, and reduce the burdens on the environment accordingly. Further, the optical scan apparatus need not be provided with a dedicated mechanism for correcting positions of the polygon mirrors. Moreover, it is possible to reduce the number of components and the materials of the light source, leading to suppressing a failure rate of the light source and reducing the burdens on the environment.

Sixth Embodiment

Figure 26:
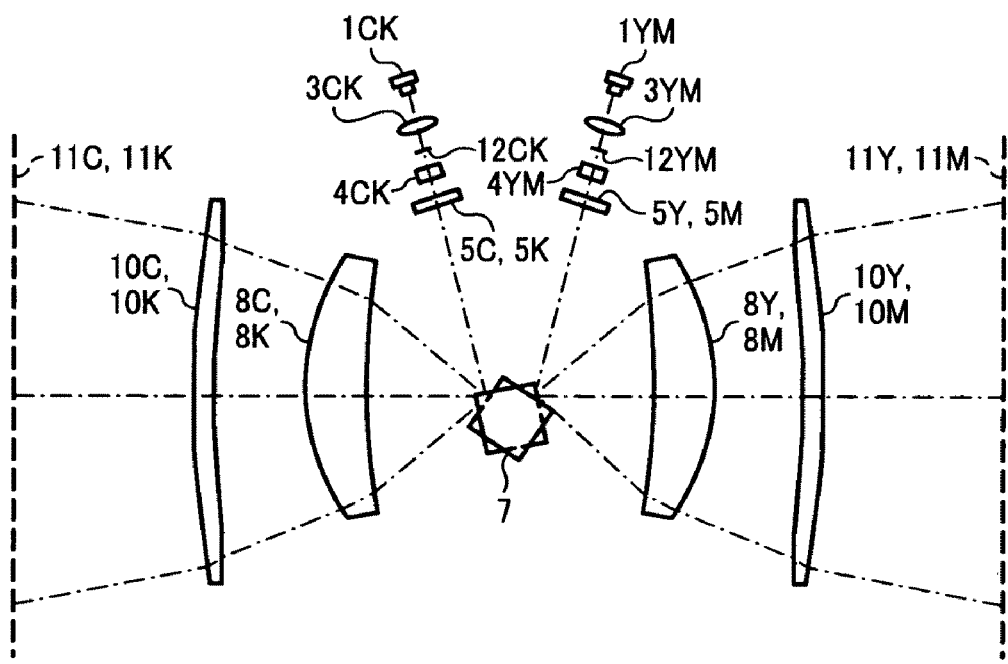
FIG. 26 is a plain view of the main parts of the optical scan apparatus according the fifth embodiment of the present invention.

Next, with reference to FIGS. 26 and 27, an image formation apparatus according to the sixth embodiment will be described. FIG. 26 is a plan view of an optical system of the optical scan apparatus. For the sake of simplicity, a reflective plate is omitted from the drawing and optical paths are represented by straight lines.

The optical scan apparatus according to the present embodiment includes two light sources (m=2), one light beam (p=1), two split light beams (q=2), and four scanning objects (n=4) as four photoconductive drums 11Y, 11M, 11C, 11K, to scan the objects with the light beams, respectively. The electrostatic latent images formed on the four photoconductive drums 11Y, 11M, 11C, 11K are individually visualized with toners equivalent to yellow, magenta, cyan, black colors to thereby form color images.

In FIG. 26, the codes 1YM, 1CK represent semiconductor lasers each of which emits a single light beam. The intensity of the semiconductor laser 1YM is modulated with an image signal corresponding to a yellow color image and an image signal corresponding to a magenta color image alternatively. The intensity of the semiconductor laser 1CK is modulated with an image signal corresponding to a cyan color image and an image signal corresponding to a black color image alternatively.

The light beams emitted from the semiconductor laser 1YM are made parallel by a coupling lens 3YM and pass through an aperture 12YM to be adjusted in width; then, they are incident on a splitter prism 4YM to be split into two separate light beams in the sub scan direction. The splitter prism 4YM is the same as the splitter prism 4 in FIG. 23. One of the split beams is used for forming an electrostatic latent image corresponding to a yellow color image and the other is used for forming an electrostatic latent image corresponding to a magenta color image.

The split light beams in the sub scan direction are gathered in the sub scan direction by cylindrical lenses 5Y, 5M which are arranged to overlap with each other in the sub scan direction, and are incident on the optical deflector 7. The optical deflector 7 is the same as the one in FIGS. 22, 24 and includes an upper polygon mirror and a lower polygon mirror with four deflection surfaces so that they are superimposedly disposed in two stages and integrated with each other with the two-staged deflection surfaces shifted from each other by a predetermined angle θ in the rotation direction. The cylindrical lenses 5Y, 5M form a linear image long in the main scan direction near the deflection surface of the upper polygon mirror.

The light beams deflected by the optical deflector 7 transmit through the fθ lenses 8Y, 8M and the toroidal lenses 10Y, 10M and form light spots on the photoconductive drum 11Y, 11M by the action of the above lenses. The photoconductive drums 11Y, 11M are scanned with the light spots.

Likewise, the light beams emitted from the semiconductor laser 1CK are made parallel by a coupling lens 3CK and pass through an aperture 12CK to be adjusted in width; then, they are incident on a splitter prism 4CK to be split into two separate light beams in the sub scan direction. The splitter prism 4CK is the same as the splitter prism 4 in FIG. 23. One of the split beams is used for forming an electrostatic latent image corresponding to a cyan color image and the other is used for forming an electrostatic latent image corresponding to a black color image.

The split light beams in the sub scan direction are gathered in the sub scan direction by cylindrical lenses 5C, 5K which are arranged to overlap with each other in the sub scan direction, and are incident on the optical deflector 7. The light beams deflected by the optical deflector 7 transmit through the fθ lenses 8C, 8K and the toroidal lenses 10C, 10K and form light spots on the photoconductive drum 11C, 11K by the action of the above lenses. The photoconductive drums 11C, 11K are scanned with the light spots.

Figure 27:
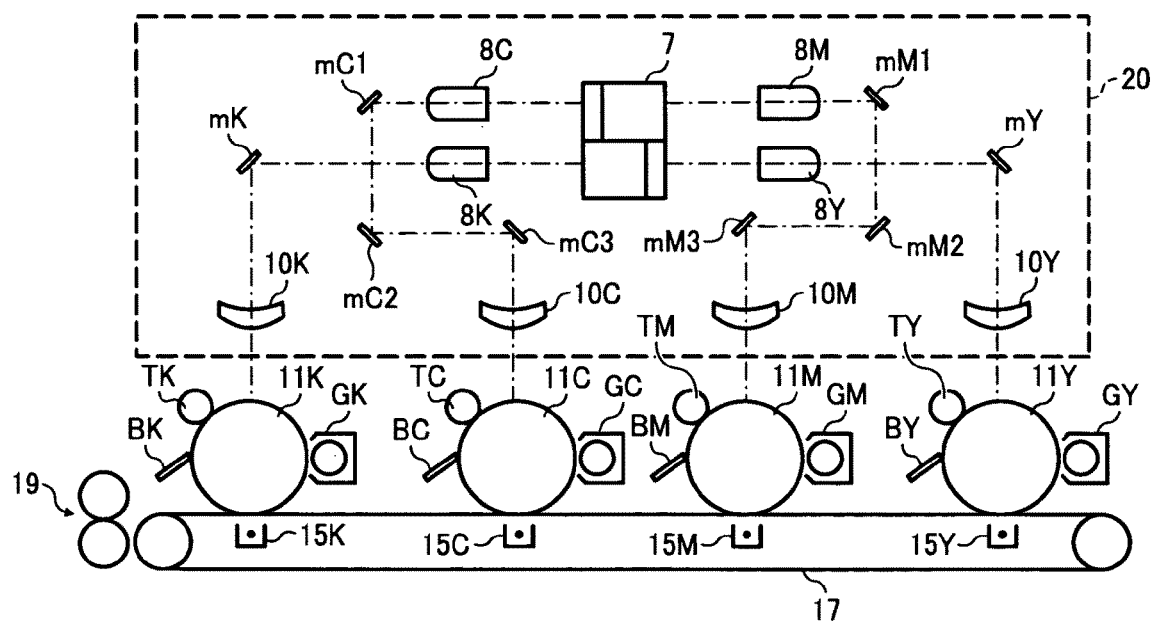
FIG. 27 is a side view of an image formation apparatus according the fifth embodiment of the present invention.

FIG. 27 is a side view of the image formation apparatus. In the drawing an area indicated by broken lines represents an optical scan apparatus 20. As shown in the drawing, one of the light beams deflected by the upper polygon mirror of the optical deflector 7 is guided through an optical path flexed by reflective mirrors mM1, mM2, mM3 to the photoconductive drum 11M while the other of the light beams is guided through an optical path flexed by reflective mirrors mC1, mC2, mC3 to the photoconductive drum 11C.

Similarly, one of the light beams deflected by the lower polygon mirror of the optical deflector 7 is guided through an optical path flexed by a reflective mirror mY to the photoconductive drum 11Y while the other of the light beams is guided through an optical path flexed by a path flexing mirror mK to the photoconductive drum 11K.

Accordingly, the light beams from the two semiconductor lasers 1YM, 1CK is split into two by the splitter prisms 4YM, 4CK, respectively, and the photoconductive drums 11Y, 11M, 11C, 11K are scanned with the four light beams. The photoconductive drums 11Y, 11M are scanned with the two split light beams from the semiconductor laser 1YM alternatively in accordance with the rotation of the optical deflector 7. The photoconductive drums 11C, 11K are scanned with the two split light beams from the semiconductor laser 1CK alternatively in accordance with the rotation of the optical deflector 7.

The photoconductive drums 11Y, 11M, 11C, 11K are rotated clockwise at a constant speed and uniformly charged by charge rollers TY, TM, TC, TK as electric chargers. The charged photoconductive drums 11Y, 11M, 11C, 11K are scanned with their respective light beams, to have yellow, magenta, cyan, black color images written thereon and respective electrostatic latent images (negative latent images) formed thereon.

The electrostatic latent images are inversely developed by developers GY, GM, GC, GK to form a yellow toner image, a magenta toner image, a cyan toner image, and a black toner image on the photoconductive drums 11Y, 11M, 11C, 11K, respectively. The respective toner images are transferred on a not-shown transfer sheet. That is, the yellow toner image formed on the photoconductive drum 11Y is transferred by a transfer device 15Y onto the transfer sheet carried by a carrier belt 17. Similarly, the magenta toner image, cyan toner image, and black toner image on the photoconductive drums 11M, 11C, 11K are transferred by transfer devices 15M, 15C, 15K in sequence, respectively.

Through the above process, the yellow toner image, magenta toner image, cyan toner image, and black toner image are superimposed on the transfer sheet to compositionally form a color image. The color image is fused on the transfer sheet by a fuser 19.

That is, the image formation apparatus according to the present embodiment is of a tandem type which individually forms electrostatic latent images on the plurality of photoconductive drums by optical scanning, visualizes the electrostatic latent images as toner images and transfers the toner images on the same transfer sheet, to thereby compositionally form images. It has the four photoconductive drums and the optical scan apparatus with the two light sources 1YM, 1CK and is configured to scan the two photoconductive drums with the light beams from the respective light sources. With such a configuration, color images are formed by forming the electrostatic latent images corresponding to magenta, yellow, cyan, black colors on the four photoconductive drums 11Y, 11M, 11C, 11K and individually visualizing them with toners of magenta, yellow, cyan, black colors.

The optical scan apparatus according to the present embodiment uses the optical deflector according to the fourth embodiment for the optical deflector 7. Therefore, the warranty for optical property of the fθ lenses and toroidal lenses can be necessity minimum and the manufacturing rate for non-defective lenses can be improved. Further, the optical scan apparatus need not be provided with a dedicated mechanism for correcting positions of the polygon mirrors. Moreover, the present invention can provide the image formation apparatus which can form images in high quality and suppress the failure rate of the light sources because of the reduced number of components thereof as well as reduce the burden on the environment.

The photoconductive drums according to the present embodiment are scanned with a single light beam, however, they can be scanned with a plurality of light beams by configuring each of the light sources as in FIG. 22.

As described above, according to the optical scan apparatus according to one embodiment of the present invention, the mean width of profile elements of a cross section of the deflection surface in the sub scan direction is set to be less than spacing between spots of the light beams formed in the sub scan direction of the deflection surface. This makes the light beams be unsusceptible to the undulation (unevenness) of the deflection surface, thereby preventing a variation in the size and shape of the spots of the light beams. Accordingly, it is able to suppress a decrease of the granularity of images and form images with high quality.

According to the optical scan apparatus according to one embodiment of the present invention, a size of an illumination area of a light beam incident on the deflection surface in the sub scan direction is set to be smaller than a value which is obtained by dividing a moving distance of the optical deflector in the rotation axis direction per a predetermined time by a rotation speed of the cutting member per a predetermined time. This makes it possible to form deflection surfaces on which the light beams are not scattered due to cutting traces thereof, and to prevent generation of ghost images due to the light beam scattering, accordingly.

The image formation apparatus according to one embodiment of the present invention comprises the above-described optical deflector so that it can form images in high quality.

Further, according to the processing method for the polygon mirror of the optical scan apparatus, it is able to mirror-cut integrated polygon mirrors with a complex shape such as ones disposed superimposedly in the rotation axis direction with a phase difference or ones integrated with a motor and to form high-precision deflection surfaces efficiently.

In addition, the integrated polygon mirrors with a complex shape can be processed with a high precision, thereby reducing noise thereof due to less vibration caused by the rotation of the optical deflector and reducing the burden on the environment and decreasing the failure rate of the light sources owing to the reduction in the number of components and materials of the light sources.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical scan apparatus comprising an optical deflector which rotates around a predetermined rotation axis to scan a scanning plane with at least three or more light beams in a main scan direction, the at least three or more light beams being spaced in a sub scan direction, said sub scan direction being transverse to said main scan direction, and wherein said optical deflector has a deflection surface that has cross sectional profile elements in said sub scan direction, each of said profile elements having adjacent mountain and reverse mountain curves, and wherein when two or more ones of said light beams are incident on the deflection surface, a mean width of said profile elements of said deflection surface of the optical deflector in the sub scan direction is set to be smaller than a spacing of adjacent ones of spots of the two or more incident light beams in the sub scan direction.

2. An optical scan apparatus according to claim 1, wherein:
the deflection surface of the optical deflector is formed by mirror-cutting in the main scan direction; and
a cutting width of the mirror-cutting in the sub scan direction is greater than an illumination area of the light beams incident on the deflection surface in the sub scan direction.

3. An optical scan apparatus according to claim 2, wherein:
the optical deflector includes a first polygon mirror and a second polygon mirror each having a plurality of deflection surfaces; and
the first and second polygon mirrors are stacked around the rotation axis with a space so that the deflection surfaces of the first polygon mirror and those of the second polygon mirror are shifted from each other by a predetermined angle around the rotation axis.

4. A manufacturing method for an optical deflector which rotates around a predetermined rotation axis to scan a scanning plane with at least three or more light beams in a main scanning direction, the at least three or more light beams being spaced in a sub scan direction, said sub scan direction being transverse to said main scan direction, and having a deflection surface that has cross sectional profile elements in said sub scan direction, each of said profile elements having adjacent mountain and reverse mountain curves, and wherein when two or more ones of said light beams are incident on the deflection surface, a mean width of said profile elements of said deflection surface of the optical deflector in the sub scan direction is set to be smaller than a spacing of adjacent ones of spots of the two or more incident light beams in the sub scan direction, the method comprising:

a rough cutting step of forming a rough deflection surface on the optical deflector; and a finish cutting step of cutting the rough deflection surface by rotating a cutting member around a rotation axis while moving the optical deflector in a predetermined rotation axis direction at a predetermined speed, to form a finished deflection surface, the rotation axis being perpendicular to the predetermined rotation axis direction of the optical deflector, wherein a size of an illumination area of said incident light beams on said finished deflection surface in the sub scan direction is set to be smaller than a value which is obtained by dividing a moving distance of the optical deflector in the rotation axis direction per a predetermined time by a rotation speed of the cutting member per a predetermined time.

5. An image formation apparatus comprising:
an optical scan apparatus comprising an optical deflector which rotates around a predetermined rotation axis to scan a scanning plane with at least three or more light beams in a main scan direction, the at least three or more light beams being spaced in a sub scan direction, said sub scan direction being transverse to said main scan direction, and wherein said optical deflector has a deflection surface that has cross sectional profile elements in said sub scan direction, each of said profile elements having adjacent mountain and reverse mountain curves, and wherein when two or more ones of said light beams are incident on the deflection surface, a mean width of said profile elements of said deflection surface of the optical deflector in the sub scan direction is set to be smaller than a spacing of adjacent ones of spots of the two or more incident light beams in the sub scan direction;

a photoreceptor on which an electrostatic latent image is formed on said scanning plane by the optical scan apparatus;

a developer section which visualizes, as a toner image, the electrostatic latent image formed on the scanning plane of the photoreceptor; and a transfer section which fuses the toner image visualized by the developer section on a recording medium.

6. A polygon mirror processing method for processing deflection surfaces of a polygon mirror of the optical scan apparatus according to claim 3 by using an apparatus with a rotatable support body and rotating the support body which has a rough cutting member and a finish cutting member disposed thereon at different distances to a center of the rotation of the support body, the method comprising:

a first step of identifying a deflection surface to be processed;

a second step of roughly cutting the identified deflection surface by the rough cutting member;

a third step of evacuating the rough cutting member; and a fourth step of finish cutting the roughly cut deflection surface by the finish cutting member.

7. A polygon mirror processing method for processing deflection surfaces of a polygon mirror of the optical scan apparatus according to claim 3 by using an apparatus with a rotatable support body and rotating the support body which has a rough cutting member and a finish cutting member disposed thereon at different distances to a center of the rotation of the support body, the method comprising:

a first step of identifying a deflection surface to be processed of a first polygon mirror;

a second step of roughly cutting the identified deflection surface of the first polygon mirror by the rough cutting member;

a third step of evacuating the rough cutting member;

a fourth step of identifying a deflection surface to be processed of a second polygon mirror;

a fifth step of roughly cutting the identified deflection surface of the second polygon mirror by the rough cutting member;

a sixth step of evacuating the rough cutting member;

a seventh step of identifying the roughly cut deflection surface of the first polygon mirror;

an eighth step of finish cutting the identified roughly cut deflection surface of the first polygon mirror by the finish cutting member;

a ninth step of evacuating the finish cutting member;

a tenth step of identifying the roughly cut deflection surface of the second polygon mirror;

an eleventh step of finish cutting the identified roughly cut deflection surface of the second polygon mirror by the finish cutting member; and a twelfth step of evacuating the finish cutting member.

8. A polygon mirror processing method for processing deflection surfaces of a polygon mirror of the optical scan apparatus according to claim 3 by using an apparatus with a rotatable support body and rotating the support body which has a rough cutting member and a finish cutting member disposed thereon at different distances to a center of the rotation of the support body, the method comprising:

a first step of identifying a deflection surface to be processed of a first polygon mirror;

a second step of roughly cutting the identified deflection surface of the first polygon mirror by the rough cutting member;

a third step of evacuating the rough cutting member;

a fourth step of finish cutting the roughly cut deflection surface of the first polygon mirror by the finish cutting member;

a fifth step of evacuating the finish cutting member;

a sixth step of identifying a deflection surface of a second polygon mirror;

a seventh step of roughly cutting the identified deflection surface of the second polygon mirror by the rough cutting member;

an eighth step of evacuating the rough cutting member;

a ninth step of finish cutting the identified roughly cut deflection surface of the second polygon mirror by the finish cutting member; and a tenth step of evacuating the finish cutting member.

9. A polygon mirror processing apparatus for the method according to claim 6, comprising:

an indexing fixture having an indexing disc which fixes a polygon mirror and rotates the polygon mirror to identify a deflection surface to be processed;

an X-axis stage being movable in a rotation axis direction of the indexing disc, and on which the indexing fixture is fixed;

a Z-axis stage being movable in a direction perpendicular to the X-axis stage;

a rotary driver section being fixed on the Z-axis stage; and a support body being attached to a main rotation axis of the rotary driver section, wherein a relational expression, $R1-R2>L1$ is satisfied where a distance between a center of the support body and a center of the rough cutting member is $R1$, a distance between a center of the support body and a center of the finish cutting member is $R2$, and a length of the polygon mirror in the rotation axis direction is $L1$.

10. A polygon mirror processing apparatus for the method according to claim 7, comprising:

an indexing fixture having an indexing disc which fixes a polygon mirror and rotates the polygon mirror to identify a deflection surface to be processed;

an X-axis stage being movable in a rotation axis direction of the indexing disc, and on which the indexing fixture is fixed;

a Z-axis stage being movable in a direction perpendicular to the X-axis stage;

a rotary driver section being fixed on the Z-axis stage; and a support body being attached to a main rotation axis of the rotary driver section, wherein a relational expression, $R1-R2>L1$ is satisfied where a distance between a center of the support body and a center of the rough cutting member is $R1$, a distance between a center of the support body and a center of the finish cutting member is $R2$, and a length of the polygon mirror in the rotation axis direction is $L1$.

11. A polygon mirror processing apparatus for the method according to claim 8, comprising:

an indexing fixture having an indexing disc which fixes a polygon mirror and rotates the polygon mirror to identify a deflection surface to be processed;

an X-axis stage being movable in a rotation axis direction of the indexing disc, and on which the indexing fixture is fixed;

a Z-axis stage being movable in a direction perpendicular to the X-axis stage;

a rotary driver section being fixed on the Z-axis stage; and a support body being attached to a main rotation axis of the rotary driver section, wherein a relational expression, $R1-R2>L1$ is satisfied where a distance between a center of the support body and a center of the rough cutting member is $R1$, a distance between a center of the support body and a center of the finish cutting member is $R2$, and a length of the polygon mirror in the rotation axis direction is $L1$.

12. A polygon mirror processing apparatus according to claim 9, wherein relational expressions, C1>B−A and C2>B−A are satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C1, and an amount of projection of a tip portion of the finish cutting member is C2.

13. A polygon mirror processing apparatus according to claim 10, wherein relational expressions, C1>B−A and C2>B−A are satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C1, and an amount of projection of a tip portion of the finish cutting member is C2.

14. A polygon mirror processing apparatus according to claim 11, wherein relational expressions, C1>B−A and C2>B−A are satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C1, and an amount of projection of a tip portion of the finish cutting member is C2.

15. A polygon mirror processing apparatus for the method according to claim 6, comprising:
an indexing fixture having an indexing disc which fixes a polygon mirror and rotates the polygon mirror to identify a deflection surface to be processed;
an X-axis stage being movable in a rotation axis direction of the indexing disc, and on which the indexing fixture is fixed;
a Z-axis stage being movable in a direction perpendicular to the X-axis stage;
a rotary driver section being fixed on the Z-axis stage; and
a support body being attached to a main rotation axis of the rotary driver section,
wherein a relational expression, R3−R4>L2 is satisfied where a distance between a center of the support body and a center of the rough cutting member is R3, a distance between a center of the support body and a center of the finish cutting member is R4, and a distance from a top surface of the first polygon mirror in the rotation axis direction to a bottom surface of the second polygon mirror in the rotation axis direction is L2.

16. A polygon mirror processing apparatus for the method according to claim 7, comprising:
an indexing fixture having an indexing disc which fixes a polygon mirror, and rotates the polygon mirror to identify a deflection surface to be processed;
an X-axis stage being movable in a rotation axis direction of the indexing disc, and on which the indexing fixture is fixed;
a Z-axis stage being movable in a direction perpendicular to the X-axis stage;
a rotary driver section being fixed on the Z-axis stage; and
a support body being attached to a main rotation axis of the rotary driver section,
wherein a relational expression, R3−R4>L2 is satisfied where a distance between a center of the support body and a center of the rough cutting member is R3, a distance between a center of the support body and a center of the finish cutting member is R4, and a distance from a top surface of the first polygon mirror in the rotation axis direction to a bottom surface of the second polygon mirror in the rotation axis direction is L2.

17. A polygon mirror processing apparatus for the method according to claim 8, comprising:
an indexing fixture having an indexing disc which fixes a polygon mirror, and rotates the polygon mirror to identify a deflection surface to be processed;
an X-axis stage being movable in a rotation axis direction of the indexing disc, and on which the indexing fixture is fixed;
a Z-axis stage being movable in a direction perpendicular to the X-axis stage;
a rotary driver section being fixed on the Z-axis stage; and
a support body being attached to a main rotation axis of the rotary driver section,
wherein a relational expression, R3−R4>L2 is satisfied where a distance between a center of the support body and a center of the rough cutting member is R3, a distance between a center of the support body and a center of the finish cutting member is R4, and a distance from a top surface of the first polygon mirror in the rotation axis direction to a bottom surface of the second polygon mirror in the rotation axis direction is L2.

18. A polygon mirror processing apparatus according to claim 15, wherein a relational expression, C4−C3>B−A is satisfied where a distance from a center of the polygon mirror to the deflection surface is A, a distance from a center of the optical deflector with the polygon mirror to a portion of the optical deflector with a maximum outer diameter is B, and an amount of projection of a tip portion of the rough cutting member is C3, and an amount of projection of a tip portion of the finish cutting member is C4.

19. A polygon mirror processing apparatus according to claim 16, wherein a relational expression, C4−C3>B−A is satisfied where a distance from a center of the polygon mirror to the deflection surface is A, a distance between a center of the optical deflector with the polygon mirror and a portion of the optical deflector with a maximum outer diameter is B, and an amount of projection of a tip portion of the rough cutting member is C3, and an amount of projection of a tip portion of the finish cutting member is C4.

20. A polygon mirror processing apparatus according to claim 17, wherein a relational expression, C4−C3>B−A is satisfied where a distance from a center of the polygon mirror to the deflection surface is A, a distance from a center of the optical deflector with the polygon mirror and a portion of the optical deflector with a maximum outer diameter is B, and an amount of projection of a tip portion of the rough cutting member is C3, and an amount of projection of a tip portion of the finish cutting member is C4.

* * * * *